United States Patent
Takano et al.

(10) Patent No.: US 10,265,928 B2
(45) Date of Patent: Apr. 23, 2019

(54) FIBER REINFORCED COMPOSITE MATERIAL STRUCTURE, COMPOSITE MATERIAL MOLDED BODY USING THE SAME, AND MANUFACTURING METHOD THEREFOR

(71) Applicant: Mitsubishi Rayon Co., Ltd., Chiyoda-ku (JP)

(72) Inventors: Tsuneo Takano, Toyohashi (JP); Yuuji Kazehaya, Toyohashi (JP); Mitsushi Nishimura, Toyohashi (JP); Akihiro Maeda, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 119 days.

(21) Appl. No.: 14/414,975

(22) PCT Filed: Jul. 18, 2013

(86) PCT No.: PCT/JP2013/069500
§ 371 (c)(1),
(2) Date: Jan. 15, 2015

(87) PCT Pub. No.: WO2014/014051
PCT Pub. Date: Jan. 23, 2014

(65) Prior Publication Data
US 2015/0183183 A1 Jul. 2, 2015

(30) Foreign Application Priority Data

Jul. 18, 2012 (JP) ................. 2012-159553
Apr. 9, 2013 (JP) ................. 2013-081019

(51) Int. Cl.
*B32B 3/28* (2006.01)
*B32B 3/30* (2006.01)
(Continued)

(52) U.S. Cl.
CPC .......... *B32B 3/28* (2013.01); *B29C 45/14508* (2013.01); *B29C 65/483* (2013.01);
(Continued)

(58) Field of Classification Search
CPC .......... B32B 3/28; B32B 3/30; B32B 2262/10; B32B 2262/101; B32B 2262/103;
(Continued)

(56) References Cited

U.S. PATENT DOCUMENTS 4,631,221 A * 12/1986 Disselbeck ............. B29C 51/00
428/166
5,364,686 A * 11/1994 Disselbeck ........... B29C 51/004
156/181
(Continued)

FOREIGN PATENT DOCUMENTS

JP  U-54-125879 A  9/1979
JP  S57-062026 U   4/1982
(Continued)

OTHER PUBLICATIONS

Translation of JP04-197624; published Jul. 17, 1992.*
(Continued)

*Primary Examiner* — Catherine A. Simone
(74) *Attorney, Agent, or Firm* — Morgan, Lewis & Bockius LLP

(57) ABSTRACT

A fiber reinforced composite material structure comprises a thin sheet that includes a first surface and a plurality of convex portions which protrude and are regularly arranged on the first surface and each of which includes a top face; and a surface material that includes a second surface and is bonded to the top faces on the second surface.

8 Claims, 17 Drawing Sheets

(51) Int. Cl.
| | |
|---|---|
| *B29C 45/14* | (2006.01) |
| *B29C 65/00* | (2006.01) |
| *B29C 65/48* | (2006.01) |
| *B29C 65/54* | (2006.01) |
| *B29C 65/82* | (2006.01) |
| *B32B 7/12* | (2006.01) |
| *B29C 65/02* | (2006.01) |
| *B29L 7/00* | (2006.01) |
| *B29L 9/00* | (2006.01) |

(52) U.S. Cl.
CPC ............ *B29C 65/54* (2013.01); *B29C 65/823* (2013.01); *B29C 66/1122* (2013.01); *B29C 66/21* (2013.01); *B29C 66/234* (2013.01); *B29C 66/438* (2013.01); *B29C 66/721* (2013.01); *B29C 66/834* (2013.01); *B32B 3/30* (2013.01); *B32B 7/12* (2013.01); *B29C 45/14336* (2013.01); *B29C 45/14811* (2013.01); *B29C 65/02* (2013.01); *B29C 65/542* (2013.01); *B29C 66/71* (2013.01); *B29C 66/7212* (2013.01); *B29C 66/72141* (2013.01); *B29C 66/7392* (2013.01); *B29C 66/7394* (2013.01); *B29C 2045/14532* (2013.01); *B29L 2007/002* (2013.01); *B29L 2009/00* (2013.01); *B32B 2260/023* (2013.01); *B32B 2260/046* (2013.01); *B32B 2262/0253* (2013.01); *B32B 2262/0269* (2013.01); *B32B 2262/10* (2013.01); *B32B 2262/101* (2013.01); *B32B 2262/103* (2013.01); *B32B 2262/106* (2013.01); *B32B 2305/076* (2013.01); *Y10T 428/24628* (2015.01); *Y10T 428/24661* (2015.01)

(58) Field of Classification Search
CPC ...... B32B 2262/106; B32B 2262/0253; B32B 2262/0269; B32B 2305/076; B32B 2260/021; B32B 2260/023; B32B 2260/046; Y10T 428/24628; Y10T 428/24661; Y10T 428/24479; Y10T 428/24562; Y10T 428/24603; Y10T 428/24612; Y10T 428/24678; Y10T 428/24669; Y10T 428/24727; Y10T 428/2476; Y10T 428/24752; Y10T 428/24793; Y10T 428/24785; B29C 51/004; B29C 51/08; B29C 51/082

USPC ... 428/166, 178, 298.1, 300.7, 299.1, 299.4, 428/299.7, 297.1, 295.4; 52/793.1, 789.1, 52/784.14, 783.1; 442/366, 367, 368, 369
See application file for complete search history.

(56) References Cited

U.S. PATENT DOCUMENTS

| | | | |
|---|---|---|---|
| 2005/0196592 A1* | 9/2005 | Tao | ........................ A42B 3/124 428/180 |
| 2011/0008566 A1 | 1/2011 | Okano et al. | |

FOREIGN PATENT DOCUMENTS

| | | | |
|---|---|---|---|
| JP | 04-197624 | A | 7/1992 |
| JP | 04-288226 | A | 10/1992 |
| JP | 05-237963 | A | 9/1993 |
| JP | 05-245960 | A | 9/1993 |
| JP | 09-177312 | A | 7/1997 |
| JP | 10-156985 | A | 6/1998 |
| JP | 11-300863 | A | 11/1999 |
| JP | 2000-043171 | A | 2/2000 |
| JP | 2000-326430 | A | 11/2000 |
| JP | 2004-509293 | A | 3/2004 |
| JP | 2004-339778 | A | 12/2004 |
| JP | 2005-169635 | A | 6/2005 |
| JP | 2006-231761 | A | 9/2006 |
| JP | 2007-038519 | A | 2/2007 |
| JP | 2007-130815 | A | 5/2007 |
| JP | 2008-230235 | A | 10/2008 |
| JP | 2010-089265 | A | 4/2010 |
| WO | 02/04203 | A1 | 1/2002 |
| WO | 2009/034906 | A1 | 3/2009 |

OTHER PUBLICATIONS

Translation of JP2006-231761; published Sep. 7, 2006.*
Japanese Office Action dated Feb. 9, 2016, for corresponding Japanese Application No. 2014-192532.
Notification of Information Statement issued in corresponding Japanese Patent Application No. 2014-192532 dated Aug. 11, 2015 (partial translation).
Japanese office Action issued in corresponding Japanese Patent Application No. 2014-192532 dated Aug. 11, 2015.
International Search Report dated Oct. 1, 2013 for International Application No. PCT/JP2013/069500.
Office Action dated Jul. 22, 2014 for corresponding Japanese Patent Application No. 2013-535604.
Indian Office Action dated Jan. 23, 2019 in corresponding Indian Application No. 361/CHENP/2015.

* cited by examiner

FIBER REINFORCED COMPOSITE MATERIAL STRUCTURE, COMPOSITE MATERIAL MOLDED BODY USING THE SAME, AND MANUFACTURING METHOD THEREFOR

TECHNICAL FIELD

The present invention relates to a fiber reinforced composite material structure which is excellent in a light weight property, a thin thickness property, and rigidity. Specifically, the fiber reinforced composite material structure of the present invention is particularly excellent in the light weight property and the thin thickness property by a configuration in which a surface material formed of continuous reinforcing fibers and a matrix resin is bonded to one surface of a thin sheet formed of continuous reinforcing fibers and a matrix resin.

The present application claims priority of Japanese Patent Application No. 2012-159553 filed on Jul. 18, 2012 and Japanese Patent Application No. 2013-081019 filed on Apr. 9, 2013, the entire contents of which are hereby incorporated by reference.

BACKGROUND ART

Since fiber reinforced plastic composite material (hereinafter, referred to as "FRP") is light in weight and high in strength and rigidity, the FRP is widely used in sports and leisure use or industrial use including automobiles or airplanes.

The FRP is also used in the casings of an electric/electronic device such as a personal computer, a household electrical appliance, and a medical instrument. In the electric/electronic device such as a personal computer and a phone, there is a need to reduce the size, weight, and thickness of the component constituting the device due to the mobile trend therefor. Particularly, in the case that, when a load is applied to the casing of such a device from the outside thereof, a part of the casing is bent to thereby and come into contact with the inner component, the inner component or the casing may be damaged. For this reason, there is a need to increase the strength and rigidity of the casing in order to prevent such problems.

Patent Document 1 discloses a sandwich structure (III) including a core (I) that forms at least one structure of a honeycomb structure, an island structure, and a structure having a void penetrating the structure in a direction parallel to the surface thereof and a fiber reinforced material (II) that is disposed on both surfaces of the core (I) and is formed of continuous reinforcing fibers and a matrix resin. Although it is described that the structure is useful as the structure that needs to be excellent in the light weight property, the thin thickness property, and the high-volume production capability, the light weight property, the thin thickness property, and the high-volume production capability are not obtained as expected due to the arrangement of the fiber reinforced material (II) on both surfaces of the core (I).

Further, Patent Document 1 discloses a configuration in which outsert-injection-molding is performed by forming a thermoplastic resin layer on the outermost layer of the sandwich structure (III) in order to form a resin structure (a thermoplastic resin composition) as a frame with hinges, bosses, and/or ribs on the outer periphery of the sandwich structure (III). Patent Document 1 discloses an advantage that a portion provided with thermoplastic resin layer is bonded by the overlap length of about 5 mm so as to be strongly integrated. However, in the structure disclosed in Patent Document 1, a bonding portion between the sandwich structure (III) and the resin structure is located on the upper surface of the resin structure. That is, since the bonding portion is formed by overlapping the sandwich structure (III) and the resin structure in the up and down direction, the thickness of the sandwich structure (III) at the overlapping bonding portion impedes the reduction of the thickness of the casing.

Further, since the sandwich structure (III) is located on the upper surface of the resin structure, the lateral end surface of the sandwich structure (III) is formed on the surface of the product. As a result, the quality of the product appearance is obtained only to a limited degree.

Patent Document 2 discloses a composite molded article formed of a plate member and a resin structure, wherein the plate member includes surface layer bases that are located at each of the topside and underside surfaces and a core layer base that is located between the both surface layer bases. Patent Document 2 discloses a composite molded article in which each surface layer base is formed of a fiber reinforced resin and the core layer base is formed of a soft material softer than the fiber reinforced resin forming each surface layer base. In Patent Document 2, it is described that the composite molded article is useful as a composite molded article that needs to be excellent in the light weight property and the thin thickness property. However, placing the core layer base which is formed of a soft material between the surface layer bases impede the light weight property and the thin thickness property.

Further, the composite moldeded article disclosed in Patent Document 2 includes a bonding surface in which the plate member and the resin structure are bonded to each other at the facing end surfaces, at least a part of the bonding interface is an undulating bonding interface in which the side end faces of the surface layer bases and the side end face of the resin structure are bonded to each other while having an undulating shape, and the front end of the resin structure in the undulating bonding interface is penetrating between both surface layer bases so that the front end is formed as a resin structure penetrating front end. Patent Document 2 describes that such a bonding surface may obtain a sufficient bonding strength. In the case where the flowability of the resin is low or the injection pressure may not be increased during the injection-molding, the convex shape of the resin structure is not sufficiently inserted into the core layer base, and hence the sufficient bonding strength between the plate member and the resin structure is hard to obtain.

CITATION LIST

Patent Document

Patent Document 1: JP 2008-230235 A
Patent Document 2: WO 2009/034906 A

DISCLOSURE OF THE INVENTION

Problem to be Solved by the Invention

The present invention is made in view of the above-described problems of the precedent art, and an object thereof is to provide a fiber reinforced composite material structure which is excellent in a light weight property and a thin thickness property.

Means for Solving Problem

According to the first aspect of the present invention, there provided is a fiber reinforced composite material structure comprising: a thin sheet that includes a first surface and a plurality of convex portions which protrude and are regularly arranged on the first surface and each of which includes a top face; and a surface material that includes a second surface and is bonded to the top faces on the second surface.

In one convex portion among the plurality of convex portions, the shape of the top face of the convex portion and the shape of a first area surrounded by a boundary line between the convex portion and the first surface may be at least one shape selected from a square shape, a rectangular shape, a rhombic shape, a triangular shape, a pentagonal shape, a hexagonal shape, a circular shape, an oval shape, a rounded square shape, a rounded rectangular shape, a rounded rhombic shape, a rounded triangular shape, a rounded pentagonal shape, and a rounded hexagonal shape.

The plurality of convex portions may include a first convex portion and a second convex portion adjacent to the first convex portion, and the pitch of the convex portions may be 1.6 to 2.4 times of the minimum diameter of the first area, where the pitch of the convex portions is defined by the gap between the center axis of the first convex portion which is perpendicular to the first surface and the center axis of the second convex portion.

In the second area provided with the plurality of convex portions arranged regularly, the ratio $\beta/\alpha$ may be equal to or larger than 5% and smaller than 40%, where $\alpha$ is the area of the second area and $\beta$ is the total area of the top faces of the plurality of convex portions.

In one convex portion among the plurality of convex portions, the area of the top face of the convex portion may be equal to or larger than 5 times of and smaller than 500 times of the square of the sheet thickness of the thin sheet.

The height of each of the plurality of convex portions may be equal to or larger than 0.5 times of and smaller than 10 times of the sheet thickness of the thin sheet.

The thin sheet may include a reinforcing fiber, and the arrangement of the plurality of convex portions may include at least one arrangement selected from a square arrangement, a rectangular arrangement in which the plurality of convex portions are arranged at the directions of 0° and 90° with respect to the longitudinal fiber direction of the reinforcing fiber, and a zigzag arrangement in which the arrangement direction of the plurality of convex portions forms an angle with respect to the longitudinal fiber direction.

In each of the plurality of convex portions, the minimum Feret diameter in a cross-section parallel to the top face may be equal to or larger than 3 times of and smaller than 30 times of the sheet thickness of the thin sheet.

A concave recess may be provided in each front end of the plurality of convex portions.

According to the second aspect of the present invention, there provided is a composite material molded body comprising: a fiber reinforced composite material structure of the first aspect; a bonding portion that is charged into a space formed between the rim portion of the thin sheet and the rim portion of the surface material; and a resin structure that is bonded to the fiber reinforced composite material structure by the bonding portion.

The composite material molded body of the second aspect of the present invention may further comprise an elongated protrusion that protrudes from the first surface and is disposed continuously so as to surround the plurality of convex portions, and the bonding portion may be charged into a space surrounded by the elongated protrusion, the rim portion of the thin sheet, and the rim portion of the surface material.

The composite material molded body of the second aspect of the present invention may further comprise an adhesive layer which is provided in a bonding interface between the fiber reinforced composite material structure of the first aspect and the resin structure.

The resin structure may include a thermoplastic resin.

The resin structure may further include a glass fiber.

According to the third aspect of the present invention, there provided is a manufacturing method for a composite material molded body including: preparing a prepreg laminate including a reinforcing fiber and a thermosetting resin composition; forming a thin sheet including a plurality of convex portions by heating and pressing the prepreg laminate using a die with protrusions or recesses; forming a fiber reinforced composite material structure by bonding a surface material to top faces of the convex portions of the thin sheet; and injecting and charging a resin material between the thin sheet and the surface material so as to bond a resin structure including the resin material to the fiber reinforced composite material structure.

Effect of the Invention

The fiber reinforced composite material structure according to the first aspect of the present invention may realize a reduction in thickness and a reduction in weight while maintaining sufficient rigidity and decreasing the amount of the adhesive used to adhere the surface material to the top faces of the convex portions of the thin sheet. Further, the fiber reinforced composite material structure according to the first aspect of the present invention may have an excellent bonding strength to the resin structure and may provide a composite material molded body of the second aspect of the present invention. The composite material molded body according to the second aspect of the present invention may be appropriately used as a casing of the electric/electronic device such as a personal computer. Further, the composite material molded body may be also used in aircraft parts, automobile parts, building products, household electrical appliances, and medical instruments.

Further, the third aspect of the present invention is the manufacturing method for the composite material molded body.

MODE(S) FOR CARRYING OUT THE INVENTION

Hereinafter, a fiber reinforced composite material structure, a composite material molded body using the same, and a manufacturing method therefor according to the first embodiment of the present invention will be described in detail with reference to the drawings. However, the invention is not limited to the invention of the drawings.

Figure 1:
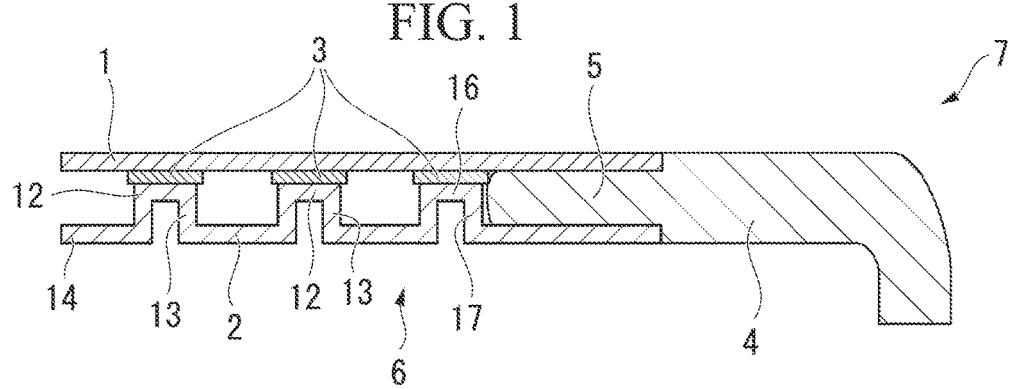
FIG. 1 is a cross-sectional view illustrating an example of a composite material molded body according to an embodiment of the present invention.
Figure 11:
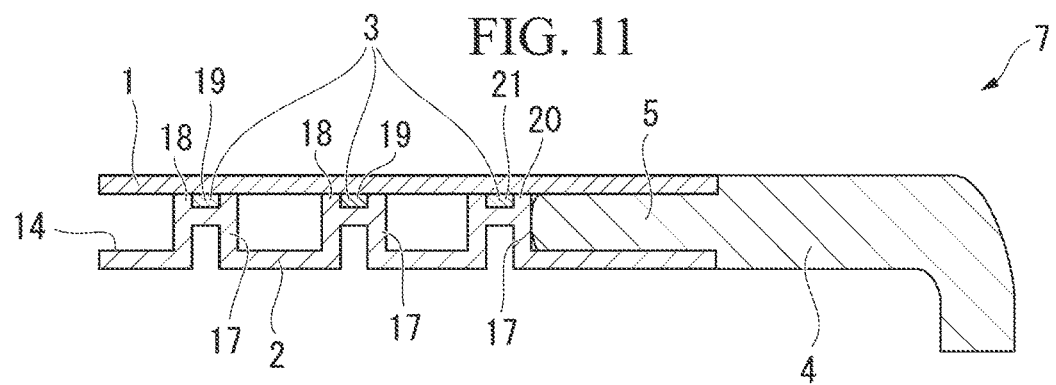
FIG. 11 is a cross-sectional view illustrating an example of a composite material molded body according to the embodiment of the present invention.
Figure 12:
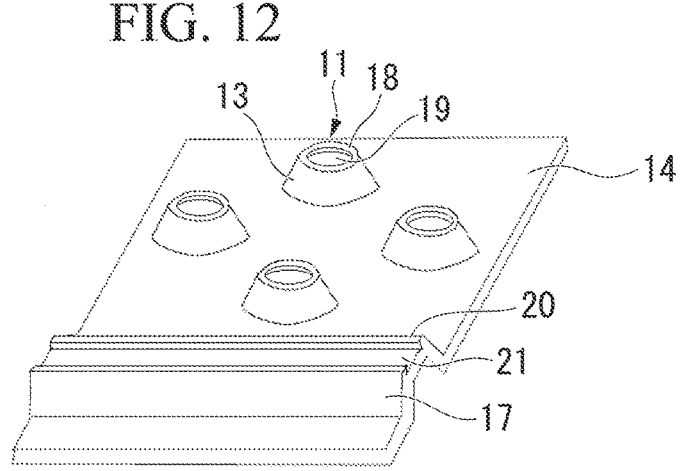
FIG. 12 is a perspective view illustrating an example of the thin sheet according to the embodiment of the present invention.
Figure 13A:
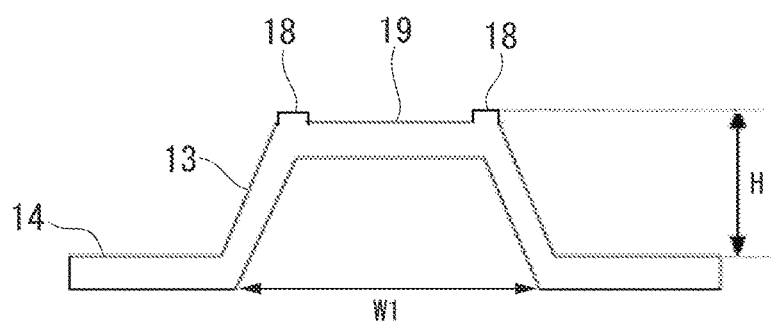
FIG. 13A is a cross-sectional view illustrating an example of a cross-sectional shape of the convex portion of the thin sheet according to the embodiment of the present invention.
Figure 13B:
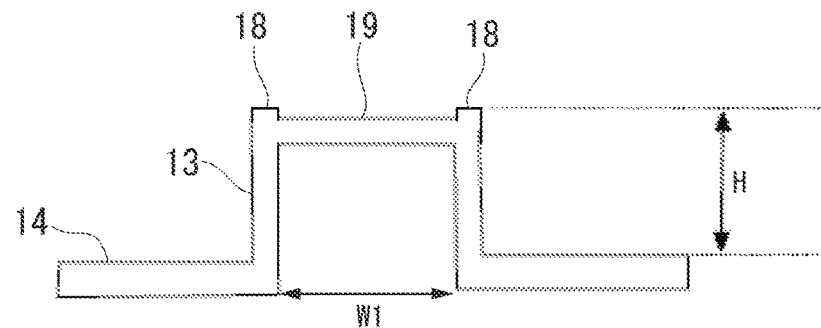
FIG. 13B is a cross-sectional view illustrating an example of a cross-sectional shape of the convex portion of the thin sheet according to the embodiment of the present invention.
Figure 14:
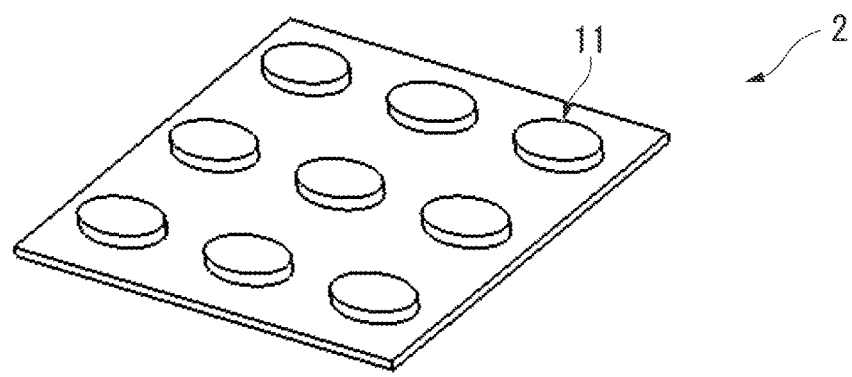
FIG. 14 is a perspective view illustrating an example of a shape of the convex portions of the thin sheet according to the embodiment of the present invention.
Figure 15:
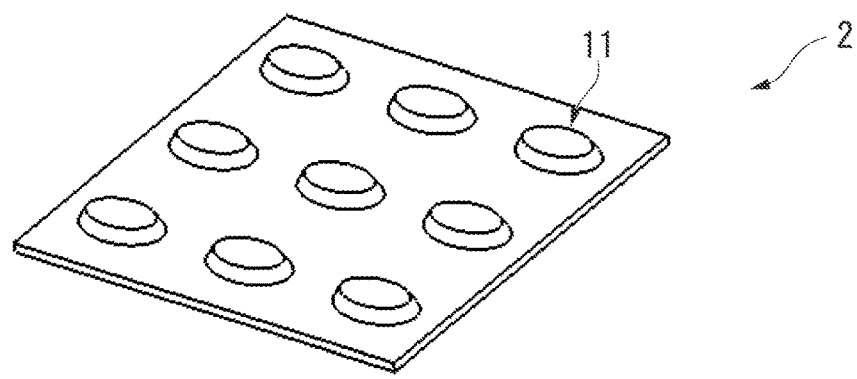
FIG. 15 is a perspective view illustrating an example of a shape of the convex portions of the thin sheet according to the embodiment of the present invention.
Figure 16:
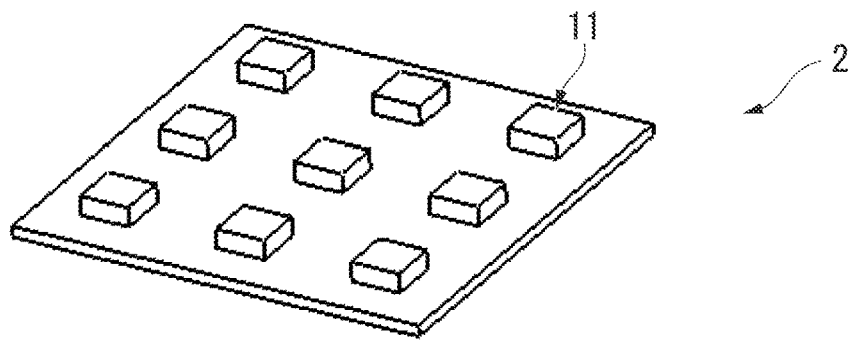
FIG. 16 is a perspective view illustrating an example of a shape of the convex portions of the thin sheet according to the embodiment of the present invention.
Figure 17:
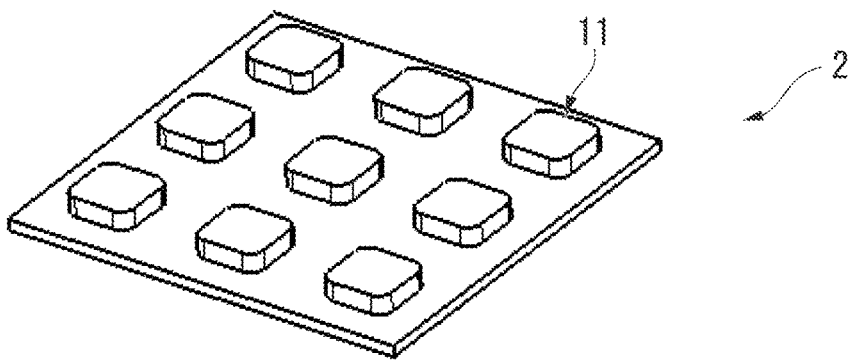
FIG. 17 is a perspective view illustrating an example of a shape of the convex portions of the thin sheet according to the embodiment of the present invention.
Figure 18:
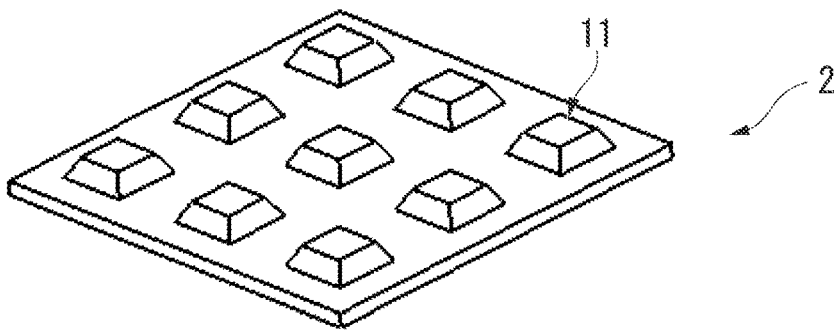
FIG. 18 is a perspective view illustrating an example of a shape of the convex portions of the thin sheet according to the embodiment of the present invention.

FIGS. 1 and 11 are diagrams illustrating an example of a composite material molded body 7 according to a first embodiment of the present invention. The composite material molded body 7 includes a fiber reinforced composite material structure 6 (hereinafter, may referred to as a composite material structure 6) and a resin structure 4. The fiber reinforced composite material structure 6 has a structure in which a convex surface (including a plurality of convex portions 11 and a plurality of top faces 12) of a thin sheet 2 including the plurality of convex portions 11 and formed of a reinforcing fiber and a matrix resin (a thermosetting resin or the like) is bonded to a surface material 1 formed of a reinforcing fiber and a matrix resin (a thermosetting resin or the like) by an adhesive 3. The tip of the resin structure 4 (a bonding portion 5 of the resin structure 4) which is located in the vicinity of the fiber reinforced composite material structure 6 is fitted between the thin sheet 2 and the surface material 1 at the rim portion of the fiber reinforced composite material structure 6 and is bonded to the fiber reinforced composite material structure 6.

Furthermore, in the case that a thermoplastic resin is used as a matrix resin used to manufacture the surface material 1 and the thin sheet 2, the surface material 1 and the thin sheet 2 may be welded to each other instead of being adhered with the adhesive 3.

The thin sheet 2 is a material in which a matrix resin is reinforced with the reinforcing fiber. As the matrix resin, thermosetting resins and a thermoplastic resins may be exemplified. Among these examples, thermosetting resins are appropriately used due to the benefit of the rigidity. As thermosetting resins, for example, an epoxy resin, a vinylester resin, an unsaturated polyester resin, a polyimid resin, a maleimide resin, or a phenolic resin may be exemplified. When a carbon fiber is used as the reinforcing fiber, an epoxy resin or a vinylester resin is appropriately used due to the benefit of the adhesiveness to the carbon fiber.

The surface material 1 is a material in which a matrix resin is reinforced with the reinforcing fiber. As the matrix resin, thermosetting resins and thermoplastic resins may be exemplified. Among these examples, thermosetting resins are appropriately used due to the benefit of the rigidity. As thermosetting resins, for example, an epoxy resin, a vinylester resin, an unsaturated polyester resin, a polyimid resin, a maleimide resin, or a phenolic resin may be exemplified. When a carbon fiber is used as the reinforcing fiber, an epoxy resin or a vinylester resin is appropriately used due to the benefit of the adhesiveness to the carbon fiber.

As the reinforcing fiber that is used in the thin sheet 2 and the surface material 1, for example, a carbon fiber, a glass fiber, an aramid fiber, a boron fiber, a silicon carbide fiber, a high-strength polyethylene fiber, a PBO fiber, or a stainless steel fiber may be exemplified. Among these examples, the carbon fiber is appropriately used due to the benefit of the light weight and the rigidity. Further, as the reinforcing fiber, a long fiber and a short fiber may be exemplified. Among these examples, the long fiber is appropriately used due to the benefit of the rigidity.

As the configuration of the long fiber, a sheet-like material in which a plurality of long fibers are arranged in parallel in one direction (a unidirectional sheet (hereinafter, referred to as a UD sheet)) or a fabric formed of the long fiber may be exemplified. Particularly, a structure in which the UD sheet is laminated so that the long fiber is aligned in 0° and 90° directions or a configuration in which a fabric formed of the long fiber is laminated is desirable due to the benefit of the excellent rigidity.

The manufacturing method for the thin sheet 2 and the surface material 1 is not particularly limited. However, for example, a press-molding method, a hand lay-up molding method, a spray-up molding method, a vacuum bag molding method, an autoclave molding method, or a resin transfer molding method using a thermosetting resin may be exemplified. Particularly, the press-molding method is appropriately used from the viewpoint of the high-volume production capability.

When the fiber reinforced composite material structure 6 and the resin structure 4 are bonded and integrated with each other, an adhesive layer (a layer of the adhesive 3) having excellent adhesiveness may be provided in the bonding interface between both the fiber reinforced composite material structure 6 and the resin structure 4. As the adhesive forming the adhesive layer, an adhesive such as an acrylic adhesive, an epoxy adhesive, or a styrene adhesive may be used. For example, an epoxy resin adhesive, a urethane adhesive, or rubber reinforced methyl methacrylate may be desirably used.

Furthermore, when a thermoplastic resin is used as the matrix resin used to manufacture the surface material 1 and the thin sheet 2, the surface material 1 and the thin sheet 2 may be welded to each other instead of being adhered with the adhesive 3.

The resin which is used in the resin structure 4 is not particularly limited, but thermoplastic resins are desirably used from the viewpoint of manufacturing the bonding shape by injection molding or the like.

When thermoplastic resin is used in the resin structure 4, there is not a particular limitation. However, polyphenylene sulfide (PPS) is more desirably used from the viewpoint of thermal resistance and the chemical resistance, polycarbonate (PC), polyphenyleneether (PPE), or a styrene resin is more desirably used from the viewpoint of the appearance and the dimensional stability of molded parts, and polyamide (PA) is more desirably used from the viewpoint of the strength and the impact resistance of molded parts.

In order to realize the high strength and the high rigidity of the composite material molded body 7, a resin containing a reinforcing fiber is desirably used as the resin of the resin structure 4. As the reinforcing fiber, the above-described reinforcing fiber is exemplified. When the resin structure 4 needs a radio wave transmission performance, a glass fiber is desirably used as the reinforcing fiber.

FIGS. 3 to 9, 12, 13A, and 13B are diagrams illustrating an example of the shape of the plurality of convex portions formed in the thin sheet 2 according to the first embodiment of the present invention.

The thin sheet 2 according to the first embodiment of the present invention includes a base 14 (a base bottom including a first surface as a base bottom surface in the thin sheet 2) and one or more convex portions 11. The convex portion 11 includes a top face portion 12 (a top face) and a connection surface 13 (the side surface of the convex portion 11) which connects the top face portion 12 to the base 14. Furthermore, the first surface indicates one surface of the base 14 in which the convex portion 11 is formed in the thin sheet 2. Further, the surface material's surface which is bonded to the top face portion 12 (the top face) is referred to as a second surface.

The shape of each of the top face portions 12 of the plurality of convex portions 11 formed in the thin sheet 2 according to the first embodiment of the present invention is not particularly limited, and a square shape, a rectangular shape, a rhombic shape, a triangular shape, a circular shape, an oval shape, a pentagonal shape, and a hexagonal shape may be used. In each of the square shape, the rectangular shape, the rhombic shape, the triangular shape, the pentagonal shape, and the hexagonal shape, at least one of the corners may be a round corner. One kind of structures selected from these shapes may be used or a plurality of structures or sizes may be used in combination.

In the cross-sectional shape of the top face portion 12 of the convex portion 11, it is desirable that the angles of the triangular shape, the pentagonal shape, and the hexagonal shape are 45° or more in order to ensure the moldability and the bonding area. Further, it is desirable that the ratio between the long diameter and the short diameter be 1.5 or less in the oval shape.

Figure 19:
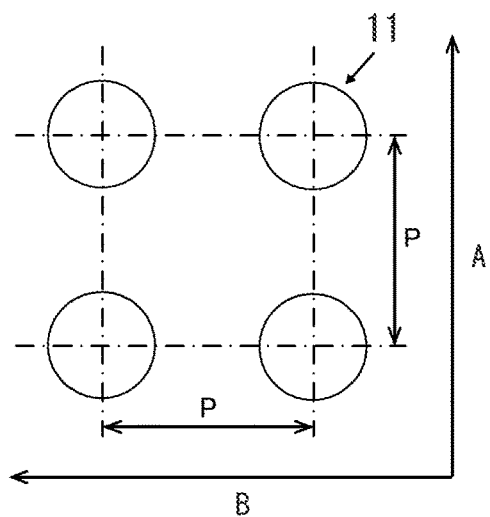
FIG. 19 is a top view illustrating an example of a shape and an arrangement of the convex portions of the thin sheet according to the embodiment of the present invention.

The arrangement direction of the convex portions 11 is not particularly limited, but regular arrangements are effective in order to obtain the stable rigidity in the entire structure. When the top face portions 12 of the convex portions 11 are arranged regularly while having the same shape, the stable rigidity may be obtained in the entire structure. Particularly, it is desirable to employ the square arrangement (FIG. 19) or the rectangular arrangement (FIG. 35) in which the convex portions are arranged in the direction of 0° (the fiber lamination direction of 0°) A and the direction of 90° (the fiber lamination direction of 90°) B in the reinforcing fiber forming the thin sheet 2 and the zigzag arrangement (FIG. 20) in which the arrangement direction of the convex portions 11 forms an angle ±θ with respect to the longitudinal orientation of the fiber.

The pitch P (FIG. 37) of the convex portions 11 is not particularly limited. However, the moldability becomes satisfactory and the rigidity as the structure degrades as the pitch P of the convex portions 11 with respect to the size W1 of the convex portion 11 increases. The pitch P of the convex portions 11 of the thin sheet 2 may be constant or may gradually change. For example, the pitch P of the convex portions 11 may have an area in which the pitch P is narrower in the center portion of the thin sheet 2 (the convex portions 11 may be densely formed) or may have an area in which the pitch P is wider at the outer edge of the thin sheet 2.

Figure 37:
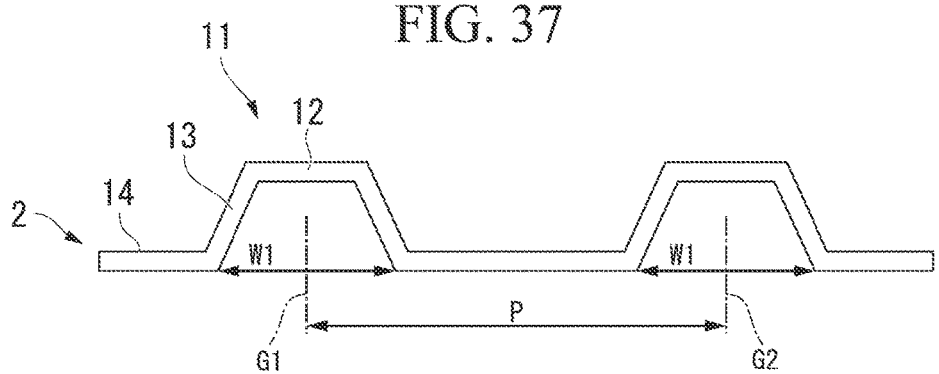
FIG. 37 is a diagram illustrating the pitch of elongated protrusions according to the embodiment of the present invention.

Furthermore, the pitch P of the convex portions 11 is defined by the gap between the center axis G1 (at the position of the geometric center of gravity of the first convex portion) of the convex portion 11 (the first convex portion) and the center axis G2 (at the position of the geometric center of gravity of the second convex portion) of the convex portion 11 (the second convex portion) adjacent to the above-described convex portion 11 (the first convex portion), where both axes of G1 and G2 are in the direction perpendicular to the base 14 (the base bottom including the first surface of the thin sheet 2) of the thin sheet 2 (FIG. 37). The convex portion 11 (the second convex portion) adjacent to the first convex portion is a convex portion 11 other than the first convex portion, and is a convex portion 11 having the shortest distance from its center axis (at the position of the geometric center of gravity of the convex portion 11) to the center axis G1 (the center axis of the first convex portion).

The size W1 of the convex portion 11 is defined as below.

The size W1 of the convex portion 11 may be defined by the diameters of the bottom surface (the first area surrounded by the boundary line between the base 14 (the base bottom including the first surface of the thin sheet 2) and the convex portion and the first area corresponding to the imaginary plane as the bottom surface of the convex portion located at the opposite side to the top face) of the convex portion 11. The size W1 of the convex portion 11 in this case is defined as the diameter of the bottom surface when the bottom surface (the first area) of the convex portion 11 is circular. For example, when the bottom surface (the first area) of the convex portion 11 is circular, the size W1 of the convex portion 11 is defined as the minimum diameter (the diameter) of the bottom surface (the first area) as an area surrounded by the boundary line between the base 14 (the base bottom including the first surface of the thin sheet 2) of the thin sheet 2 and the convex portion 11.

When the bottom surface (the first area) of the convex portion 11 is oval, the size is defined as the average value of the long diameter and the short diameter. When the bottom surface (the first area) of the convex portion 11 is square or rectangular, the size is defined as the length of the diagonal line. When the bottom surface (the first area) of the convex portion 11 is rhombic, the size is defined as the average value of the lengths of two diagonal lines. When the bottom surface (the first area) of the convex portion 11 is triangular, pentagonal, and hexagonal, the size is defined as the diameter of the minimum circumscribed circle.

It is desirable that the pitch P of the convex portions 11 be 1.6 to 2.4 times of the size W1 of the convex portion 11 in order to obtain the composite material structure 6 having satisfactory rigidity. When smaller than 1.6 times or larger than 2.4 times, the rigidity of the composite material structure 6 decreases. However, the desirable range of the pitch P of the convex portions 11 may be exceptionally set depending on the arrangement or the shape of the convex portion 11.

Figure 4A:
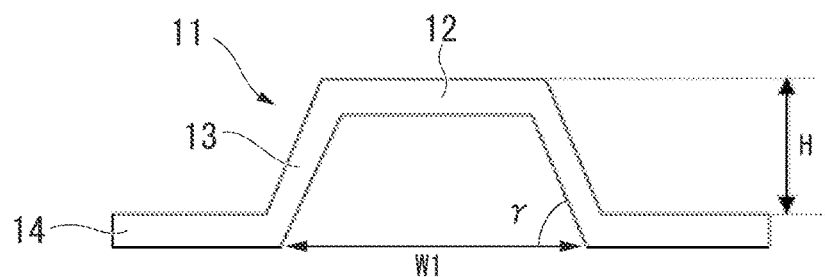
FIG. 4A is a cross-sectional view illustrating an example of a cross-sectional shape of a convex portion of the thin sheet according to the embodiment of the present invention.
Figure 4B:
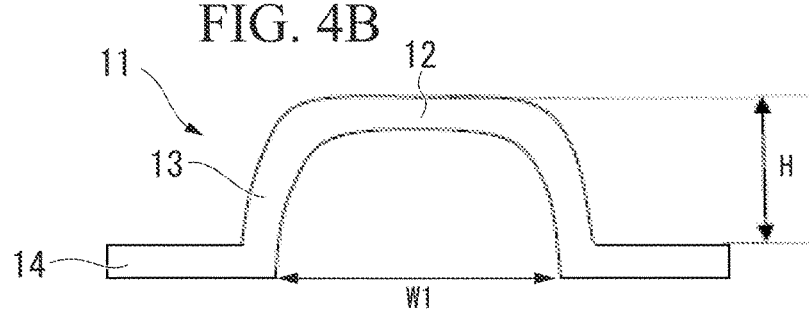
FIG. 4B is a cross-sectional view illustrating an example of a cross-sectional shape of a convex portion of the thin sheet according to the embodiment of the present invention.
Figure 4C:
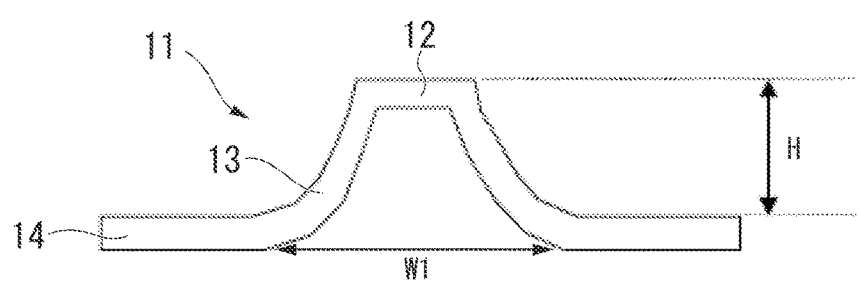
FIG. 4C is a cross-sectional view illustrating an example of a cross-sectional shape of a convex portion of the thin sheet according to the embodiment of the present invention.
Figure 4D:
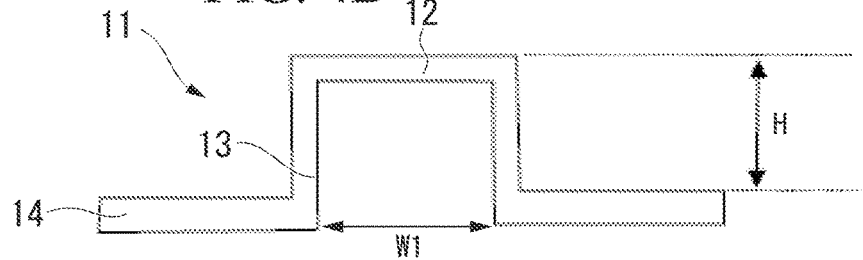
FIG. 4D is a cross-sectional view illustrating an example of a cross-sectional shape of a convex portion of the thin sheet according to the embodiment of the present invention.
Figure 5:
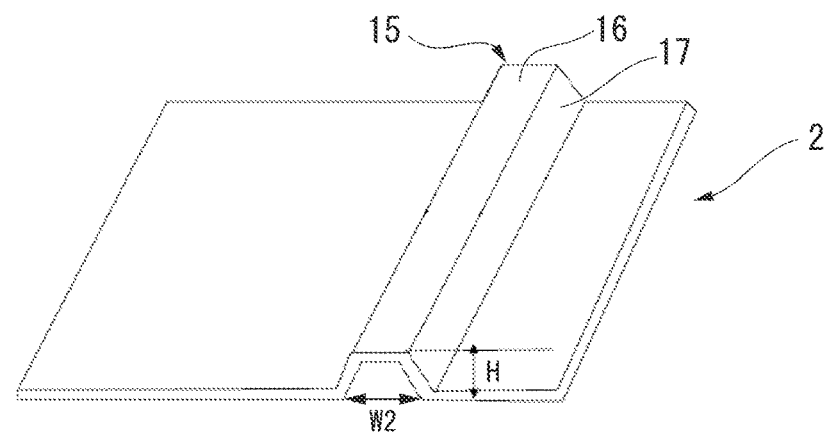
FIG. 5 is a perspective view illustrating an example in which the convex portion of the thin sheet according to the embodiment of the present invention is an elongated protrusion.
Figure 6:
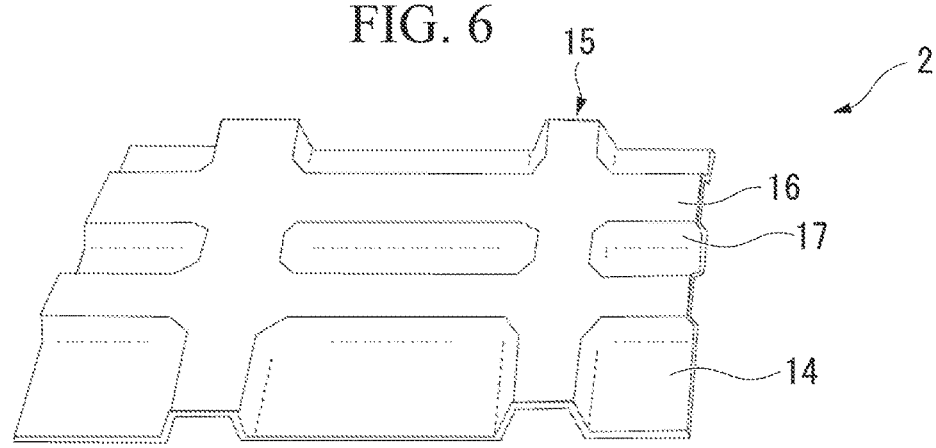
FIG. 6 is a perspective view illustrating an example in which the convex portion of the thin sheet according to the embodiment of the present invention is a lattice-shaped protrusion.
Figure 7:
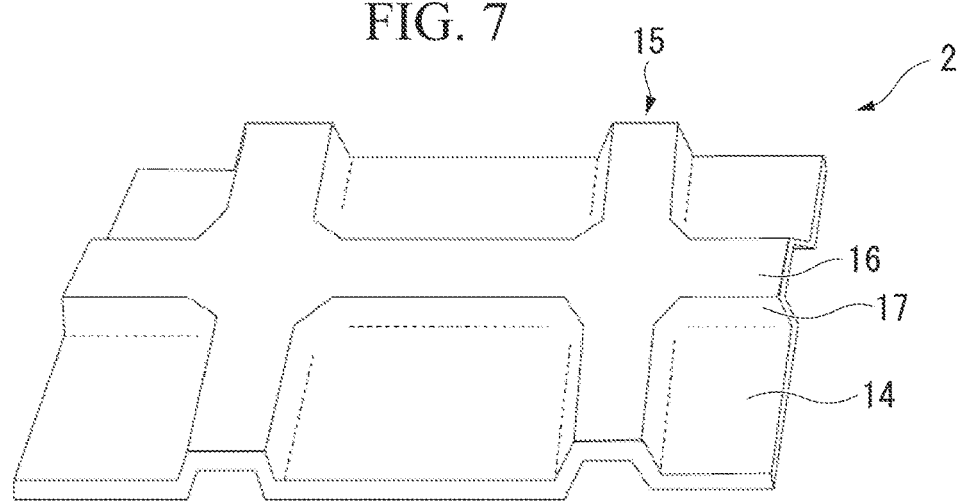
FIG. 7 is a perspective view illustrating an example of a shape of the convex portion of the thin sheet according to the embodiment of the present invention.
Figure 8:
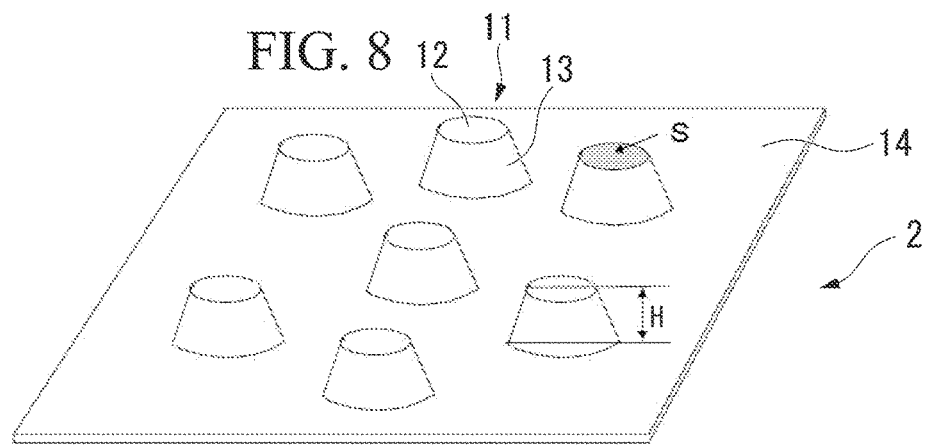
FIG. 8 is a perspective view illustrating an example of a shape of the convex portions of the thin sheet according to the embodiment of the present invention.
Figure 9:
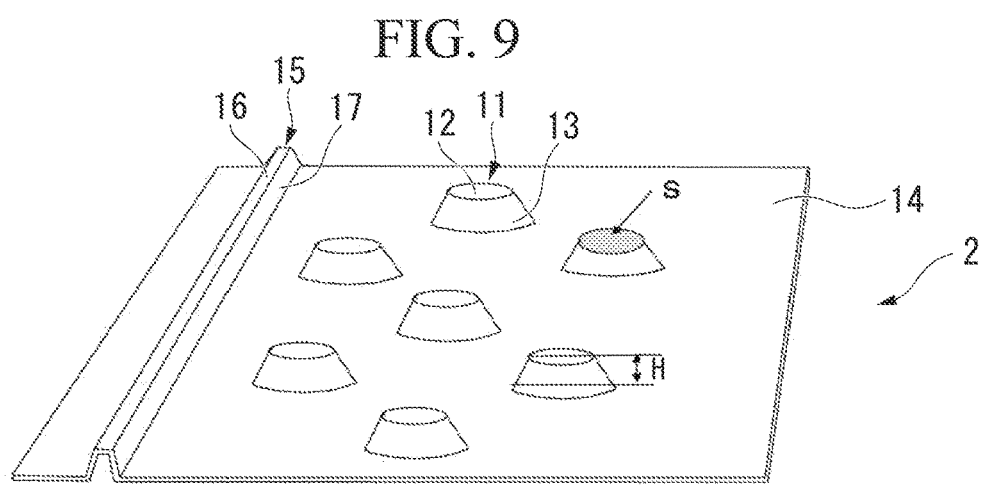
FIG. 9 is a perspective view illustrating an example of a shape of the convex portions of the thin sheet according to the embodiment of the present invention having different shapes or sizes.
Figure 10:
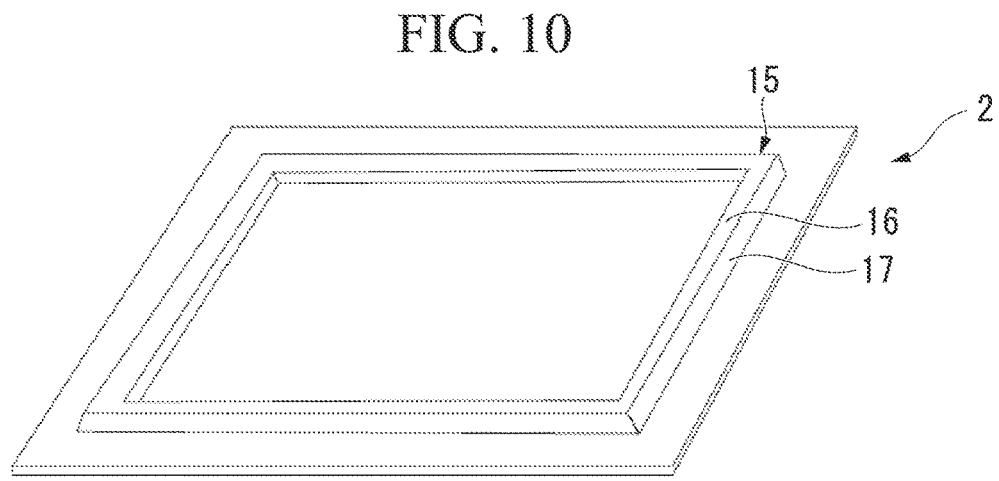
FIG. 10 is a perspective view illustrating an example in which the convex portion of the thin sheet according to the embodiment of the present invention is a frame-shaped protrusion.

The shape of the connection surface 13 connecting the base 14 to the top face portion 12 of the convex portion 11 is not particularly limited, and the connection surface may be a normal surface (FIG. 4D) perpendicular to the top face portion 12 and the base 14, an inclined surface (FIG. 4A) having an angle γ with respect to the base 14, or a curved surface (FIGS. 4B and 4C). In the inclined surface, the moldability is improved compared to the shape of the normal surface, but the rigidity decreases as the angle γ with respect to the base 14 becomes acuter. For this reason, it is desirable that the angle γ of the inclined surface with respect to the base 14 be 45° to 90°.

Even when the connection surface 13 is formed as the inclined surface having the angle γ with respect to the base 14, it is desirable that the pitch P of the convex portions 11 be 1.6 to 2.4 times of the size W1 of the convex portion 11 in order to obtain the composite material structure 6 having satisfactory rigidity. When smaller than 1.6 times or larger than 2.4 times, the rigidity of the composite material structure 6 decreases. However, the desirable range of the pitch P of the convex portions 11 becomes different depending on the arrangement or the shape of the convex portions 11, and is not limited to the above-described range.

Even the pitch P of the convex portions 11 in this case is defined as the gap between the center axis of the convex portion 11 (the center axis of the first convex portion) and the center axis of the second convex portion 11 (the center axis of the second convex portion) adjacent to the former convex portion 11, where the axes are in the direction perpendicular to the base 14 (the base bottom including the first surface in the thin sheet 2) of the thin sheet 2.

In the square arrangement and the zigzag arrangement, the pitch P of the convex portions 11 is set to the length of one side of the evenly dividing diamond shape, when each of the diamond shape includes total of one convex portion 11. In this case, it is desirable that the pitch P of the convex portions 11 be equal to or larger than 1.6 times of and equal to or smaller than 2.4 times of the size W1 of the convex portion 11 in order to obtain the composite material structure 6 having satisfactory rigidity. When the pitch P of the convex portions 11 is smaller than 1.6 times of or larger than 2.4 times of the size W1 of the convex portion 11, the rigidity of the structure decreases.

In the rectangular arrangement, it is desirable that the length of the long side and the length of the short side of the evenly dividing rectangular shape, when each of the rectangular shape includes total of one convex portion 11, are equal to or larger than 1.6 times of and equal to or smaller than 2.4 times of the size W1 of the convex portion 11 and the ratio of the length of the long sides to the length of the short sides is equal to or larger than 1 and equal to or smaller than 1.25 in order to obtain the composite material structure 6 having satisfactory rigidity. When the pitch P of the convex portions 11 is smaller than 1.6 times or larger than 2.4 times of the size W1 of the convex portion 11, the rigidity of the composite material structure 6 decreases. Further, when the ratio of the length of the long sides to the length of the short sides is smaller than 1 or equal to or larger than 1.25, the rigidity of the composite material structure 6 decreases.

The area S of the top face portion 12 of each convex portion 11 is not particularly limited, and may be a size in which the surface material 1 is sufficiently bonded to the top face portion 12 of the convex portion 11 by the application of the adhesive. Further, the convex portion 11 may be an elongated protrusion 15 (including an upper surface 16 and side surfaces 17) which is formed in a linear shape, a continuous curve shape, a frame shape, or a lattice shape as long as the top face portion 12 of the convex portion 11 has a sufficient width for applying the adhesive. Further, it is desirable that a concave recess 19 be formed in a front end 18 of the convex portion 11 (FIGS. 11, 12, 13A, and 13B). Further, even a front end 20 of the elongated protrusion may include a concave recess 21 (FIGS. 11, 12, 13A, and 13B).

The ratio of the sum of the areas S of the top face portions 12 of the convex portions 11 and the areas of the upper surfaces 16 of the elongated protrusions 15 to the area of the thin sheet 2 is desirably 50% or less, more desirably 30% or less, and particularly desirably 20% or less. When the ratio exceeds 50%, the surface material 1 and the thin sheet 2 are substantially and simply bonded to each other, and hence the rigidity of the composite material structure 6 decreases. Further, it is desirable that the ratio of the sum of the areas be 5% or more. When the ratio of the sum of the areas is smaller than 5%, the rigidity of the composite material structure 6 decreases, and hence the deflection increases.

In the thin sheet 2, it is desirable that the area ratio F/E be 50% or less on the assumptions that the E indicates the area of the 1stC area (a plane area on the first surface including the base 14, the bottom surfaces (the first area) of the convex portions 11, and the bottom portions (the 1stD area as the imaginary plane) of the elongated protrusions) in which the base 14 of the thin sheet 2 extends in a two-dimensional shape and that the F indicates the sum of the area of the 1stD area and the first area. The area ratio F/E is more desirably 30% or less and particularly desirably 20% or less. Further, it is desirable that the area ratio F/E be 5% or more. When the area ratio F/E exceeds 50%, the surface material 1 and the thin sheet 2 are substantially and simply bonded to each other, and hence the rigidity of the composite material structure 6 decreases. When the area ratio is smaller than 5%, the rigidity of the composite material structure 6 decreases, and hence the deflection increases.

In the thin sheet 2, in order to obtain satisfactory rigidity, it is desirable that the ratio $\beta/\alpha$ be equal to or larger than 5% and smaller than 40% on the assumptions that the $\alpha$ indicates the area of the area (the second area) provided with the even convex portions 11 and that the $\beta$ indicates the sum of the area of the top face portions 12 of the convex portions 11 in the area (an area which is called the second area, a plane area in which the base 14 extends in a two-dimensional shape, and a plane area which includes the base 14 and the first area (the imaginary plane as the bottom portions of the convex portions) except for the area provided with the projection 15) in which the convex portions 11 are provided evenly. When the ratio $\beta/\alpha$ is 40% or more, the surface material 1 and the thin sheet 2 are substantially and simply bonded to each other, and hence the rigidity improvement effect for the composite material structure 6 may not be obtained. When the ratio $\beta/\alpha$ is smaller than 5%, the rigidity of the composite material structure 6 when the size W1 of the convex portion 11 increases, and hence the deflection increases.

Further, in the thin sheet 2, in order to obtain satisfactory rigidity, it is desirable that the ratio $J/\alpha$ be equal to or larger than 5% and smaller than 40% on the assumptions that the $\alpha$ indicates the area of the second area and that the J indicates the sum of the area of the bottom surfaces (the first area) of the convex portions. When the ratio $J/\alpha$ is 40% or more, the surface material 1 and the thin sheet 2 are substantially and simply bonded to each other, and hence the rigidity improvement effect for the composite material structure 6 may not be obtained. When the ratio $J/\alpha$ is smaller than 5%, the rigidity of the composite material structure 6 decreases when the size W1 of the convex portion 11 increases, and hence the deflection increases.

In the thin sheet 2, in order to obtain satisfactory rigidity, it is desirable that the area S of the top face portion 12 of the convex portion 11 be equal to or larger than 5 times of and smaller than 500 times of the square of the sheet thickness of the thin sheet 2. When the area of the top face portion 12 of the convex portion 11 is smaller than 5 times of the square of the sheet thickness of the thin sheet 2, the rigidity of the composite material structure 6 decreases. Even when the area S of the top face portion 12 of the convex portion 11 is equal to or larger than 500 times of the square of the sheet thickness of the thin sheet 2, the rigidity of the composite material structure 6 decreases.

In the thin sheet 2, in order to obtain satisfactory rigidity, it is desirable that the area of the bottom surface (the first area) of the convex portion 11 be equal to or larger than 5 times of and smaller than 500 times of the square of the sheet thickness of the thin sheet 2. When the area of the bottom surface (the first area) of the convex portion 11 is smaller than 5 times of the square of the sheet thickness of the thin sheet 2, the rigidity of the composite material structure 6 decreases. Even when the area of the bottom surface (the first area) of the convex portion 11 is equal to or larger than 500 times of the square of the sheet thickness of the thin sheet 2, the rigidity of the composite material structure 6 decreases.

It is desirable that the height H of the convex portion 11 be equal to or larger than 0.5 times of and smaller than 10.0 times of the thickness of the thin sheet 2. When the height H of the convex portion is smaller than 0.5 times of the thickness of the thin sheet 2, the surface material 1 and the thin sheet 2 are simply bonded to each other. Accordingly, the rigidity of the composite material structure 6 is improved only to a small degree, and the effect for weight reduction may not be obtained. When the height H of the convex portion is 10.0 times or more of the thickness of the thin sheet 2, the molding is difficult. It is more desirable that the height H of the convex portion be equal to or larger than 1.5 times of and smaller than 4.0 times of the thickness of the thin sheet 2. It is particularly desirable that the height H of the convex portion be equal to or larger than 2.0 times of and smaller than 4.0 times of the thickness of the thin sheet 2. It is desirable that the height H of the convex portions 11 be evenly set, but a difference in height may be set as long as the convex portion is bonded to the surface material 1. The convex portion 11 which is not bonded to the surface material 1 substantially does not contribute to the improvement of the rigidity of the composite material structure 6.

In the convex portion 11, when the minimum Feret diameter in the cross-section in a direction parallel to the top face portion 12 is equal to or larger than 3 times of and smaller than 30 times of the sheet thickness of the thin sheet 2, the rigidity of the composite material structure 6 is satisfactory. In the convex portion 11, when the minimum Feret diameter in the cross-section in a direction parallel to the top face portion 12 is smaller than 3 times of or equal to or larger than 30 times of the sheet thickness of the thin sheet, the rigidity of the composite material structure 6 decreases.

Further, it is desirable that the convex portions 11 be distributed over the entire surface of the thin sheet 2. When the convex portions 11 are distributed to a partial area, the rigidity needed as the rigidity of the composite material structure 6 is not exhibited. It is desirable not to form the convex portion, in a portion where the resin structure 4 is inserted and injected in the rim portion of the thin sheet 2 after the composite material structure 6 is formed or where bonding interface with the bonding portion 5 of the resin structure is provided.

In the embodiment of the present invention, it is particularly desirable to form the elongated protrusion 15 at a predetermined position from the rim of the thin sheet 2 so that a desired amount of the resin structure 4 (the bonding portion 5) is injected and inserted into the composite material structure 6 after the composite material structure 6 is manufactured. In this case, the bonding portion 5 is charged into a space surrounded by the rim portion of the surface material 1, the rim portion of the thin sheet 2, and the elongated protrusion 15. With this structure, since the elongated protrusion 15 (the side surface 17 of the elongated protrusion 15) serves as a guide when the resin structure 4 is formed in the case where the resin structure 4 is molded by injection molding, the depth of the portion in which the resin is inserted and injected may be precisely controlled.

Next, an example of the manufacturing method of the composite material molded body 7 (FIGS. 1 and 11) will be described.

<Molding of Thin Sheet>

Figure 2:
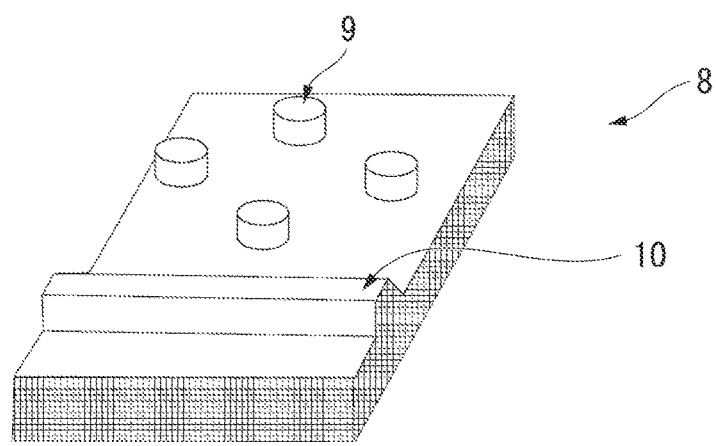
FIG. 2 is a perspective view illustrating an example of a die having protrusions for molding a thin sheet according to the embodiment of the present invention.
Figure 3:
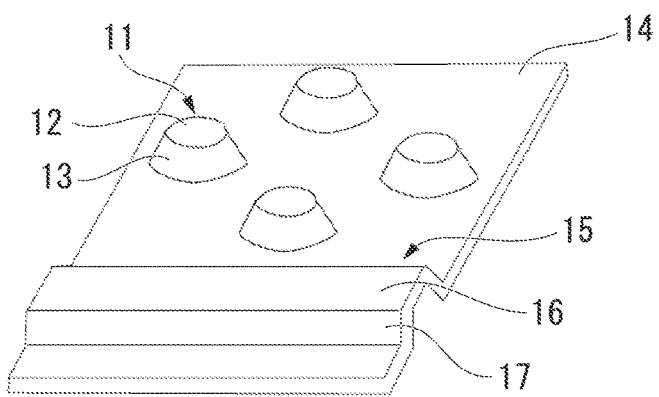
FIG. 3 is a perspective view illustrating an example of a thin sheet that is molded by using the die illustrated in FIG. 2 according to the embodiment of the present invention.

First, a laminate of a prepreg obtained by impregnating a thermosetting resin composition into a reinforced fiber is disposed on a surface of a lower die 8 for a thin sheet. In the lower die 8 for the thin sheet, a portion which becomes the convex portion 11 or the elongated protrusion 15 of the thin sheet 2 includes protrusions 9 and 10 (FIG. 2) or a recess (not illustrated).

When the lower die 8 with the protrusions is used, a die with concave portions which correspond to the convex portions 11 and the elongated protrusions may be used as an upper die for a press-molding method. Further, when the lower die 8 with the recess is used, a die with convex portions which correspond to the convex portions 11 and the elongated protrusions may be used as an upper die of a press-molding method. When a soft material which forms a concave shape or a convex shape according to the protrusion or the recess of the lower die 8 by compressing is used as the upper die, there is no need to provide a convex shape or a concave shape on the molding surface of the upper die. Furthermore, the upper die is not used in the case of a vacuum bag molding method.

Subsequently, the laminate of the prepreg is heated and molded, while being pressurized by the lower die 8 and the upper die after closing them in the press molding method, or while being pressurized by the vacuum pressure through the bag in the vacuum bag molding method. After molded, the cured laminate of the prepreg is separated from the dies, and hence the thin sheet 2 (FIGS. 3 and 12) with the convex portions 11 may be obtained. Furthermore, in the thin sheet 2 obtained by molding the laminate of the prepreg, the respective portions which are deformed by the molding are called the base 14 including the base bottom surface (the first surface) of the thin sheet 2 and the convex portions 11 protruding from the base 14. Further, the convex portion 11 includes the top face portion (the top face) 12 and the connection surface 13 (the side surface of the convex portion 11) connecting the top face portion 12 and the base 14 to each other (FIG. 1).

<Molding of Surface Material>

The surface material 1 is obtained similarly to the molding of the thin sheet 2. However, since the surface material is a simply curved surface or a plane, the lower die 8 for the surface material has a shape of a simply curved surface or a plane shape. Furthermore, the shape of the surface material 1 may be a shape which includes a corner (a ridge) or a step such as a recess of a logo corresponding to the design of the PC casing and may be selected corresponding to the usage. Further, the shape of the thin sheet 2 may be determined corresponding to the shape of the surface material 1.

The surface material 1 and the thin sheet 2 do not need to have a symmetric configuration in order to prevent warping since the surface material 1 and the thin sheet 2 are bonded after the molding thereof. A decoration material such as a woven fabric may be used for the surface material 1. Further, fire-retardant resin material may be appropriately used as the surface material 1 and the thin sheet 2.

<Bonding of Thin Sheet and Surface Material>

The thin sheet 2 and the surface material 1 are combined with each other after applying an adhesive to the top face portions 12 of the convex portions 11 and the upper surface 16 of the elongated protrusion 15 of the thin sheet 2 or the concave recess 19 of the front end (the top face) 18 of the convex portions 11 and the recess 21 of the front end (the upper surface) 20 of the elongated protrusion, and the adhesive 3 is cured so that the fiber reinforced composite material structure 6 is obtained.

The obtained fiber reinforced composite material structure 6 is set inside the injection-molding die, the die is clamped, and a thermoplastic resin composition forming the resin structure 4 is injected to be molded. Thus, the resin structure 4 is bonded to the side end surface of the surface material 1 and the thin sheet 2 forming the fiber reinforced composite material structure 6 illustrated in FIGS. 1 and 11, and a resin material is injected and inserted between the surface of the rim portion of the thin sheet 2 and the surface of the rim portion of the surface material 1, obtaining the composite material molded body 7 (FIGS. 1 and 11).

EXAMPLES

Hereinafter, the present invention will be described in more detail using the examples below. Furthermore, the invention is not limited to the examples.

Example 1

In the example, a unidirectional prepreg manufactured by Mitsubishi Rayon Co., Ltd. and having a product name of TR390E125S (an epoxy resin #390 (manufactured by Mitsubishi Rayon Co., Ltd.) as a thermosetting resin and a carbon fiber as a reinforcing fiber (manufactured by Mitsubishi Rayon Co., Ltd. and having a product name of TR50S)) was used.

First, a laminate having the four layers of unidirectional prepreg (the unidirectional sheet) laminated at the angles of 0°, 90°, 90°, and 0° was disposed on the surface of the thin sheet lower die 8 including the protrusions to form the convex portions 11 of the thin sheet 2. Subsequently, the die was closed with the upper die having the recesses corresponding to the protrusions of the lower die 8, and the prepreg laminate was pressed for 5 minutes at the pressure of 8 MPa while being heated at 140° C. using the lower die 8 and the upper die so as to integrally cure the prepreg laminate. After the compression molding, the die was opened, and the thin sheet 2 having a thickness of 0.44 mm and the shape illustrated in FIG. 11 was obtained. Furthermore, the shape of the top face portion 12 of the truncated conical convex portion 11 was circle having a diameter of 10.0 mm, the height H of the convex portion 11 was 1.0 mm, the pitch of the convex portions 11 was 10.0 mm, the shape of the concave recess 19 of the front end 18 of the convex portion 11 was circle having a diameter of 9 mm, and the depth of the concave recess 19 was 0.1 mm. The width of the upper surface 16 of the linear elongated protrusion 15 was 10.0 mm, and the height H of the elongated protrusion 15 was 1.0 mm.

Furthermore, the angle of 0° mentioned above indicates the direction of the short edge, when the surface material 1 or the thin sheet 2 is rectangular.

The angle of 90° mentioned above indicates the long edge direction (the direction of 90°) of the surface material 1 or the thin sheet, perpendicular to the direction indicated by the angle of 0°.

When the surface material 1 or the thin sheet 2 is not rectangular, the minimum Feret diameter direction is defined as the direction of 0°, and the direction of 90° indicates the direction perpendicular to the direction of 0°.

In addition, the unidirectional prepreg was laminated as four layers on the surface of the lower die for the surface material as [0°/90°/90°/0°]. Subsequently, the die was closed, and the prepreg laminate was pressed for 5 minutes at the pressure of 8 MPa while being heated at 140° C. using the lower die and the upper die so as to integrally cure the prepreg laminate. After the compression molding, the die was opened so that the thin surface material 1 having a thickness of 0.44 mm was obtained.

A resin adhesive 3 obtained by mixing a base resin (Ciba-Geigy and having the product name of Araldite AW106) and a curing agent (Ciba-Geigy and having the product name of Hardener HV953U) according to the mass ratio of 100:60 was applied to the concave recess 19 of the front end 18 of the convex portion 11 of the obtained thin sheet 2. Then, the surface material 1 was disposed on the convex surfaces (the top face portions 12 of the convex portions 11) of the thin sheet 2 having the adhesive 3 applied thereto, and kept at 70° C. for 50 minutes, thus the surface material 1 was bonded to one surface of the thin sheet 2 with the adhesive 3 so that the fiber reinforced composite material structure 6 having a thickness of 1.90 mm was obtained. The obtained fiber reinforced composite material structure 6 was a fiber reinforced composite material structure 6 having very high rigidity, an excellent light weight property, and an excellent thin thickness property.

The obtained fiber reinforced composite material structure 6 was set inside a injection molding die, the die was clamped, and a glass fiber reinforced polyamide resin (manufactured by TOYOBO CO., LTD, having the product name of Glamide TY791GT, and having a glass fiber content of 55 mass %) as a resin forming the resin structure 4 was injected to be molded so that the composite material molded body 7 (FIG. 1) illustrated in FIG. 1 was obtained. The fiber reinforced composite material structure 6 and the resin structure 4 were strongly integrated with each other.

Example 2

In the examples below, computer simulations were performed by referring to the result of Example 1.

"Femap with NX Nastran" was used as the simulation software, and the constrain condition was set as a simple support.

The thin sheet 2 and the surface material 1 of the example was molded in a manner such that a unidirectional prepreg manufactured by Mitsubishi Rayon Co., Ltd. and having a product name of TR390E125S (epoxy resin #390 (manufactured by Mitsubishi Rayon Co., Ltd.) as thermosetting resin and a carbon fiber (manufactured by Mitsubishi Rayon Co., Ltd. and having a product name of TR50S) as reinforcing fiber) was laminated as three layers as [0°/90°/0°], and the laminate was pressed and cured for 5 minutes at the pressure of 8 MPa while being heated at 140° C.

As the thin sheet 2, a molded sheet is used which has a longitudinal width of 200 mm and a lateral width of 300 mm and in which the columnar convex portions 11 each having a diameter of 5.0 mm are regularly arranged with 10 mm interval in the longitudinal and lateral directions (the pitch P of the convex portions) of the column center axes of the adjacent convex portions 11. As the surface material 1, a molded sheet is used of which the longitudinal width and the lateral width are equal to those of the thin sheet 2. In the evaluation, the fiber reinforced composite material structure 6 in which the surface material 1 is bonded to the top face portion 12 of the convex portion 11 of the thin sheet 2 is used.

The thickness of the structure of this example is determined by the sum of the height H of the convex portion 11, the lamination thicknesses of the thin sheet 2 and the surface material 1, and the thickness of the adhesive 3. The thickness of each layer forming the laminate is set to be equal to one another, and the thickness and the weight of the structure of this example are set to be equal to those of the sandwich structure of Comparative Example 1. A structure having a thickness of 1.45 mm and a mass of 77.9 g is obtained by setting the height H of the columnar convex portion 11 to be 0.602 mm, by setting the thickness of each layer in the laminate to be 0.125 mm, and setting the thickness of the adhesive 3 to 0.1 mm.

Figure 26:
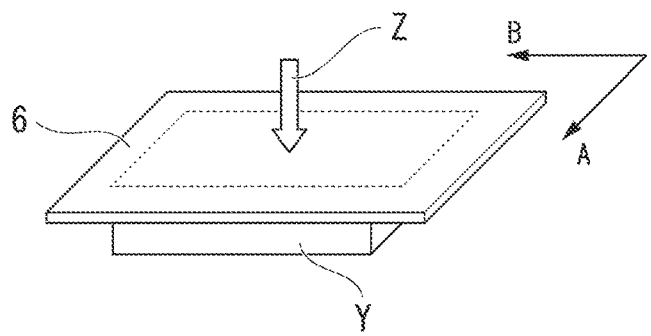
FIG. 26 is a perspective view illustrating an example of a rigidity evaluation method for a composite material molded body according to the embodiment of the present invention.

Evaluated is the rigidity of the fiber reinforced composite material structure 6 obtained by bonding the surface material 1 and the thin sheet 2 including the convex portions 11 with the adhesive 3 on the top face portions 12 of the convex portions 11 of the thin sheet 2. The evaluation method is the bending test for sheet, and the bending displacement of the center portion of the surface material 1 is evaluated by applying an intensive load Z to the center portion thereof while the support condition is set so that the surface material is simply supported at four edges (using the support table Y) (FIG. 26). The distance between the support points is set so that the longitudinal length is 160 mm, the lateral length is 260 mm, and the load value is 5 kgf. The bending displacement is obtained by measuring the maximum bending displacement at the center portion of the lower surface of the structure (near the thin sheet 2).

The maximum bending displacement of the structure according to the bending test becomes 2.46 mm. The bending displacement was smaller than that of Comparative Example 1, and the rigidity was larger than that of Comparative Example 1. Since the weight of the structure is the same, it is expected the same rigidity as the sandwich structure be obtained while obtaining weight reduction, by decreasing the laminate thickness in the thin sheet 2 and the surface material 1.

Example 3

The thickness and the weight of the structure of this example are set to be the same as those of the sandwich structure of Comparative Example 2. A structure having a thickness of 1.35 mm and a mass of 74.4 g is obtained by setting the height H of the columnar convex portions 11 to be 0.535 mm and setting the thickness of each of the layers forming the laminate to be 0.119 mm using the same method as Example 2.

The maximum bending displacement becomes 2.98 mm by the same bending test of the structures that of Example 2. Here, the bending displacement and the rigidity are the same as those of Comparative Example 2.

Example 4

The thickness and the weight of the structure of this example are set to be the same as those of the sandwich structure of Comparative Example 3. A structure having a thickness of 1.25 mm and a mass of 71.0 g is obtained by setting the height H of the columnar convex portions 11 to be 0.468 mm and setting the thickness of each of the layers forming the laminated body to 0.114 mm using the same method as Example 2.

By the same bending test as Example 2, the maximum bending displacement of the structure of the example becomes 3.66 mm.

Comparative Example 1

In the comparative example, the sandwich structure (III) including the core (I) forming the structure and the fiber reinforced material (II), which include the continuous reinforcing fiber and the matrix resin, disposed on both surfaces of the core (I) was examined as the structure which is practically used as in Patent Document 1 and others.

The fiber reinforced material (II) is formed from the same materials as Example 2. Each of the fiber reinforced materials on both surfaces is a double-layer laminate, and the laminate is disposed so that the laminate on the upper surface are disposed at the directions of [0°/90°] and so that the laminate on the lower surface are disposed at the directions of [90°/0°]. In this way, the laminates on the upper surface and the lower surface are symmetrical to each other with the core (I) interposed therebetween. Foamed polypropylene (having an elastic modulus of 0.65 GPa) is used as the core (I).

The thickness of the structure of the comparative example is determined by the sum of the thicknesses of the core (I) and the laminates (the laminate on the upper surface and the laminate on the lower surface of the fiber reinforced material (II) disposed on each surface of the core). A structure having a thickness of 1.45 mm and a mass of 77.9 g is obtained by setting the thickness of the core to be 1.05 mm and setting the thickness of each of the layers forming the laminate to be 0.1 mm.

By the same bending test as Example 2, the bending displacement of the structure becomes 2.56 mm.

Comparative Example 2

A structure having a thickness of 1.35 mm and a mass of 74.4 g is obtained by setting the thickness of the core to be 0.95 mm in the sandwich structure of Comparative Example 1.

By the same bending test as Example 2, the bending displacement of the structure becomes 2.99 mm.

Comparative Example 3

A structure having a thickness of 1.25 mm and a mass of 71.0 g is obtained by setting the thickness of the core to be 0.85 mm in the sandwich structure of Comparative Example 1.

By the same bending test as Example 2, the bending displacement of the structure becomes 3.54 mm.

Figure 28:
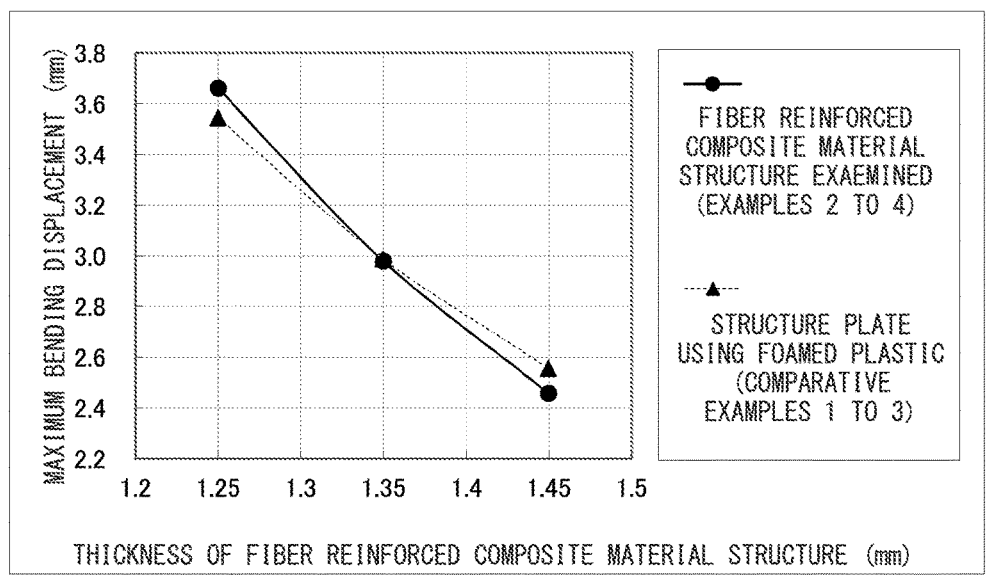
FIG. 28 is a graph illustrating an example of a rigidity evaluation results for the composite material molded bodies according to the examples of the present invention.

The results of Examples 2 to 4 and Comparative Examples 1 to 3 are illustrated in FIG. 28. When the composite material structure is used as Examples 2 to 4 of the present invention, the bending displacement of the composite material structure decreases as the thickness of the composite material structure increases. So, it may be concluded that the rigidity becomes better than those of the sandwich structures (the structures of Comparative Examples 1 to 3) as the art.

The optimal shape of the convex portions 11 is examined in order to examine the effective shape as the fiber reinforced composite material structure 6 in which the structure including the surface material 1 and the thin sheet 2 with the convex portions 11 are bonded by the adhesive 3. In Examples 5 to 26, the arrangement of the convex portions 11 and the pitch P of the convex portions 11 (the interval between the center axis G1 of a first convex portion 11 and the center axis G2 of a second convex portion 11 adjacent thereto) is examined.

Example 5

In Example 4, a case is examined in which a structure having a thickness of 1.25 mm is obtained by setting the thickness of each layer of the fiber reinforced composite material layers forming the surface material 1 and the thin sheet 2 to be 0.1 mm, setting the height H of the convex portion 11 to be 0.55 mm, and setting the pitch P of the convex portions to be 6 mm.

By the same bending test as Example 2, the maximum bending displacement of the structure of the example becomes 5.40 mm.

Example 6

In Example 5, the pitch P of the convex portions is changed to 8 mm.

By the same bending test as Example 2, the maximum bending displacement of the structure of the example becomes 4.12 mm.

Example 7

In Example 5, the pitch P of the convex portions is changed to 10 mm.

By the same bending test as Example 2, the maximum bending displacement of the structure of the example becomes 4.05 mm.

Example 8

In Example 5, the pitch P of the convex portions is changed to 12 mm.

By the same bending test as Example 2, the maximum bending displacement of the structure of the example becomes 4.33 mm.

Example 9

In Example 5, the pitch P of the convex portions is changed to 14 mm.

By the same bending test as Example 2, the maximum bending displacement of the structure of the example becomes 4.83 mm.

Example 10

Figure 20:
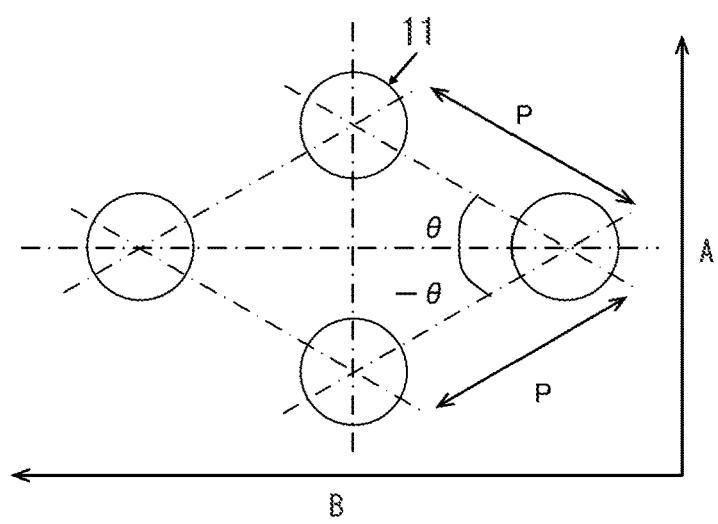
FIG. 20 is a top view illustrating an example of a shape and an arrangement of the convex portions of the thin sheet according to the embodiment of the present invention.

In Example 5, a case is examined in which the arrangement of the convex portions 11 is changed to the zigzag arrangement illustrated in FIG. 20. The arrangement of the convex portions 11 of the structure is changed to the zigzag arrangement in which the convex portions are arranged in the direction of ±30° with respect to the fiber direction, and the pitch P of the convex portions is changed to 6 mm.

By the same bending test as Example 2, the maximum bending displacement of the structure of the example becomes 6.86 mm.

Example 11

In Example 10, the pitch P of the convex portions is changed to 8 mm.

By the same bending test as Example 2, the maximum bending displacement of the structure of the example becomes 4.48 mm.

Example 12

In Example 10, the pitch P of the convex portions is changed to 10 mm.

By the same bending test as Example 2, the maximum bending displacement of the structure of the example becomes 4.06 mm.

Example 13

In Example 10, the pitch P of the convex portions is changed to 12 mm.

By the same bending test as Example 2, the maximum bending displacement of the structure of the example becomes 4.15 mm.

Example 14

In Example 10, the pitch P of the convex portions is changed to 14 mm.

By the same bending test as Example 2, the maximum bending displacement of the structure of the example becomes 4.46 mm.

Example 15

In Example 10, the pitch P of the convex portions is changed to 16 mm.

By the same bending test as Example 2, the maximum bending displacement of the structure of the example was 4.95 mm.

Example 16

In Example 5, the arrangement direction of the convex portions 11 of the structure is changed. The arrangement is changed to the zigzag arrangement in which the convex portions 11 of the structure are arranged in the direction of ±45° with respect to the fiber direction, and the pitch P of the convex portions is changed to 6 mm.

By the same bending test as Example 2, the maximum bending displacement becomes 7.44 mm.

Example 17

In Example 16, the pitch P of the convex portions is changed to 8 mm.

By the same bending test as Example 2, the maximum bending displacement of the structure of the example becomes 4.67 mm.

Example 18

In Example 16, the pitch P of the convex portions is changed to 10 mm.

By the same bending test as Example 2, the maximum bending displacement of the structure of the example becomes 4.13 mm.

Example 19

In Example 16, the pitch P of the convex portions is changed to 12 mm.

By the same bending test as Example 2, the maximum bending displacement of the structure of the example becomes 4.17 mm.

Example 20

In Example 16, the pitch P of the convex portions is changed to 14 mm.

By the same bending test as Example 2, the maximum bending displacement of the structure of the example becomes 4.49 mm.

Example 21

In Example 16, the pitch P of the convex portions is changed to 16 mm.

By the same bending test as Example 2, the maximum bending displacement of the structure of the example becomes 4.97 mm.

Example 22

In Example 6, the arrangement direction of the convex portions 11 is changed. The arrangement is changed to the zigzag arrangement in which the convex portions 11 of the structure are arranged in the direction of ±60° with respect to the fiber direction, and the pitch P of the convex portions is changed to 8 mm.

By the same bending test as Example 2, the maximum bending displacement becomes 5.32 mm.

Example 23

In Example 22, the pitch P of the convex portions is changed to 10 mm.

By the same bending test as Example 2, the maximum bending displacement becomes 4.40 mm.

Example 24

In Example 22, the pitch P of the convex portions is changed to 12 mm.

By the same bending test as Example 2, the maximum bending displacement becomes 4.23 mm.

Example 25

In Example 22, the pitch P of the convex portions is changed to 14 mm.
By the same bending test as Example 2, the maximum bending displacement becomes 4.35 mm.

Example 26

In Example 22, the pitch of the convex portions is changed to 16 mm.
By the same bending test as Example 2, the maximum bending displacement becomes 4.69 mm.

Figure 29:
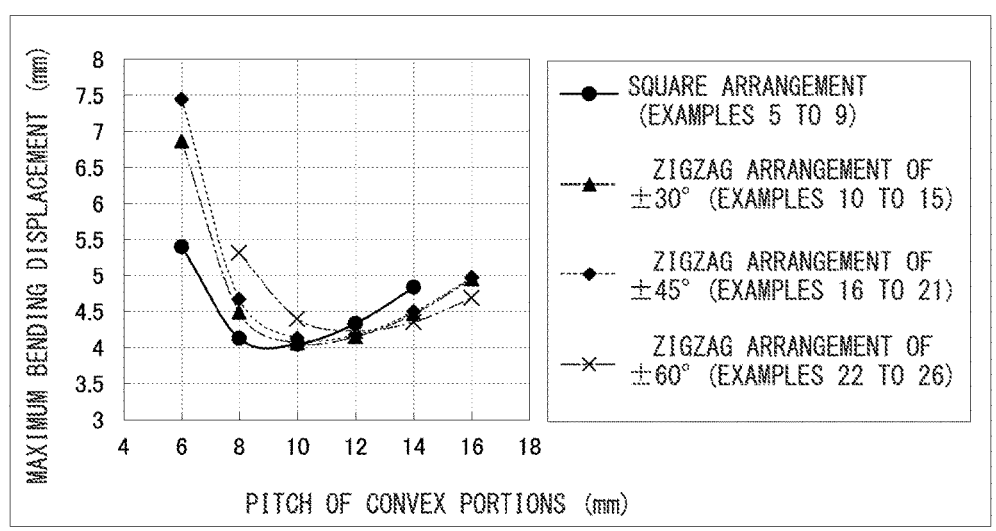
FIG. 29 is a graph illustrating an example of a rigidity evaluation results for the composite material molded bodies according to the examples of the present invention.

The results of Examples 5 to 26 are illustrated in FIG. 29. In any arrangement, the maximum bending displacement is minimized when the pitch P of the convex portions becomes 10 to 12 mm with respect to the diameter of 5 mm of the convex portion 11, and the bending amount is about the same within ±2 mm of the pitch at which the maximum bending displacement is minimized.

Meanwhile, when the pitch P of the convex portions is equal to or smaller than 8 mm or equal to or larger than 12 mm, the bending displacement increases and hence the rigidity largely decreases.

In the case using column convex portions for the fiber reinforced composite material structure 6 in which the surface material 1 and the thin sheet 2 with the convex portions 11 are bonded to each other by the adhesive 3, it is desirable that the pitch P of the convex portions be 1.6 to 2.4 times of the size W1 of the convex portion.

Further, the minimum of the maximum bending displacement is substantially the same in any arrangement, and an excellent rigidity effect may be obtained in the square arrangement and the zigzag arrangement.

Further, the moldability is better in the zigzag arrangement, since a difference in cross-sectional length in the longitudinal direction of the fiber becomes smaller compared to the square arrangement.

In Examples 27 to 50 below, the pitch P of the convex portions and the shape and the size of the convex portions are examined.

In Examples 27 to 38, the shape of the convex portions 11 is changed to an oval shape.

Example 27

Figure 21:
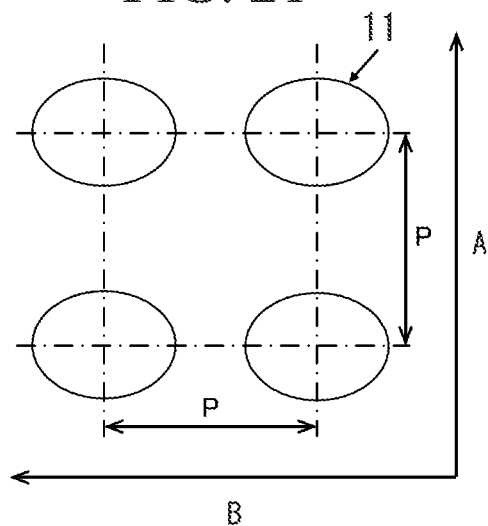
FIG. 21 is a top view illustrating an example of a shape and an arrangement of the convex portions of the thin sheet according to the embodiment of the present invention.

In Example 5, the shape of the convex portions 11 is changed to oval shape, and the arrangement is changed to a square arrangement (FIG. 21).
The short diameter of the oval shape is set to be 5 mm, the long diameter is set to be 7.5 mm, and the pitch P of the convex portions is changed to 10 mm.
By the same bending test as Example 2, the maximum bending displacement becomes 4.68 mm.

Example 28

In Example 27, the pitch P of the convex portions is changed to 12 mm.
By the same bending test as Example 2, the maximum bending displacement becomes 4.41 mm.

Example 29

In Example 27, the pitch P of the convex portions is changed to 14 mm.
By the same bending test as Example 2, the maximum bending displacement becomes 4.60 mm.

Example 30

In Example 27, the pitch P of the convex portions is changed to 16 mm.
By the same bending test as Example 2, the maximum bending displacement becomes 5.00 mm.

Example 31

In Example 27, the shape of the convex portion 11 is changed to an oval shape.
The short diameter is set to be 5 mm, the long diameter is set to be 10 mm, and the pitch P of the convex portions is set to be 12 mm.
By the same bending test as Example 2, the maximum bending displacement becomes 5.10 mm.

Example 32

In Example 31, the pitch P of the convex portions is changed to 14 mm.
By the same bending test as Example 2, the maximum bending displacement becomes 4.73 mm.

Example 33

In Example 31, the pitch P of the convex portions is changed to 16 mm.
By the same bending test as Example 2, the maximum bending displacement becomes 4.82 mm.

Example 34

In Example 31, the pitch P of the convex portions is changed to 18 mm.
By the same bending test as Example 2, the maximum bending displacement becomes 5.10 mm.

Example 35

Figure 22:
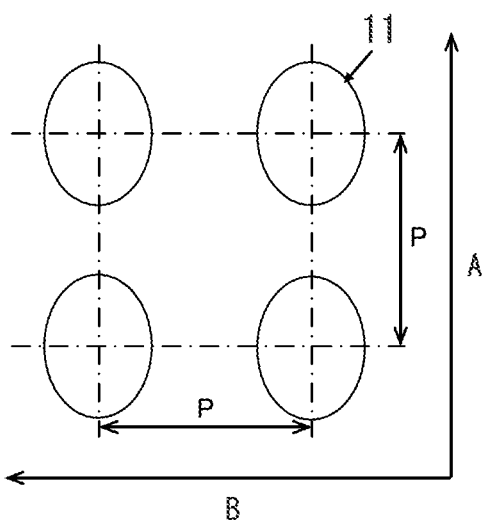
FIG. 22 is a top view illustrating an example of a shape and an arrangement of the convex portions of the thin sheet according to the embodiment of the present invention.

In Example 27, the arrangement of the convex portions 11 is changed to the square arrangement and the shape of the convex portion is changed to the oval shape rotated by 90° (FIG. 22).
The short diameter of the oval shape is set to be 5 mm, the long diameter is set to be 7.5 mm, and the pitch P of the convex portions is set to be 9 mm.
By the same bending test as Example 2, the maximum bending displacement becomes 4.33 mm.

Example 36

In Example 35, the pitch P of the convex portions is changed to 10 mm.
By the same bending test as Example 2, the maximum bending displacement becomes 4.28 mm.

Example 37

In Example 35, the pitch P of the convex portions is changed to 12 mm.
By the same bending test as Example 2, the maximum bending displacement becomes 4.29 mm.

Example 38

In Example 35, the pitch P of the convex portions is changed to 14 mm.

By the same bending test as Example 2, the maximum bending displacement becomes 4.64 mm.

Figure 30:
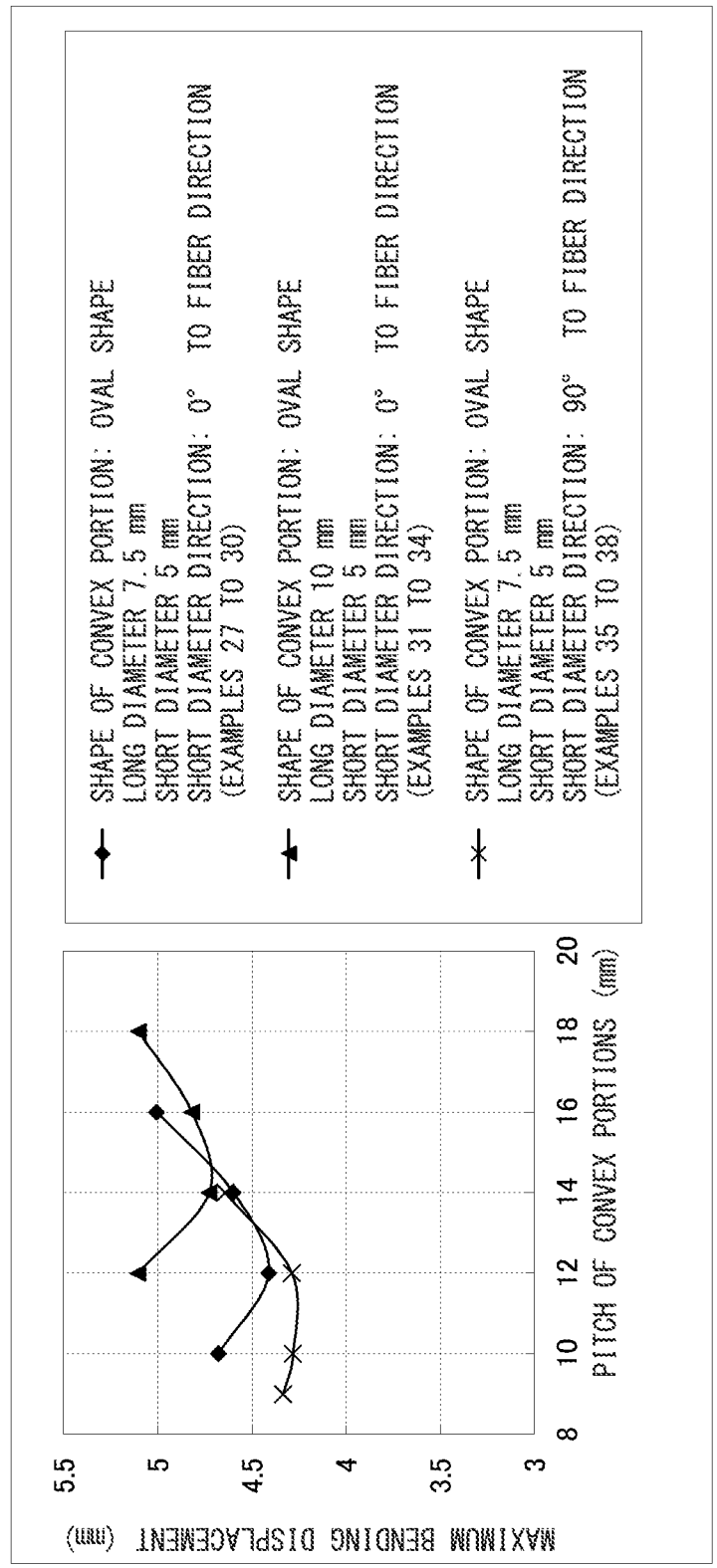
FIG. 30 is a graph illustrating an example of a rigidity evaluation results for the composite material molded bodies according to the examples of the present invention.

The results of Examples 27 to 38 are illustrated in FIG. 30.

When the convex portion 11 is oval, the rigidity becomes maximal in the range in which the pitch P of the convex portions is about 2 times of the average value of the short and large diameters of the oval shape, and a satisfactory rigidity effect may be obtained in the range of 1.6 to 2.4 times.

Further, when a ratio between the long and short diameters of the oval shape increases, the maximum bending displacement increases and the rigidity effect decreases. For this reason, it is desirable that the long diameter is 1.5 times or less of the short diameter in the convex portion 11 of the oval shape.

In Examples 39 to 46 below, the shape of the convex portions 11 is changed to square shape.

Example 39

Figure 23:
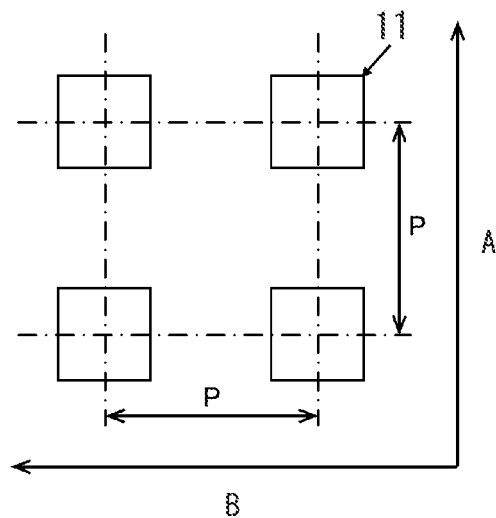
FIG. 23 is a top view illustrating an example of a shape and an arrangement of the convex portions of the thin sheet according to the embodiment of the present invention.

In Example 5, the shape of the convex portion 11 is changed to square shape, and the arrangement is changed to square arrangement (FIG. 23).

The diagonal line of the square is set to be 5 mm, and the pitch P of the convex portions is set to be 6 mm.

By the same bending test as Example 2, the maximum bending displacement becomes 4.22 mm.

Example 40

In Example 39, the pitch P of the convex portions is changed to 8 mm.

By the same bending test as Example 2, the maximum bending displacement becomes 3.84 mm.

Example 41

In Example 39, the pitch P of the convex portions is changed to 10 mm.

By the same bending test as Example 2, the maximum bending displacement becomes 4.00 mm.

Example 42

In Example 39, the pitch P of the convex portions is changed to 12 mm.

By the same bending test as Example 2, the maximum bending displacement becomes 4.43 mm.

Figure 31:
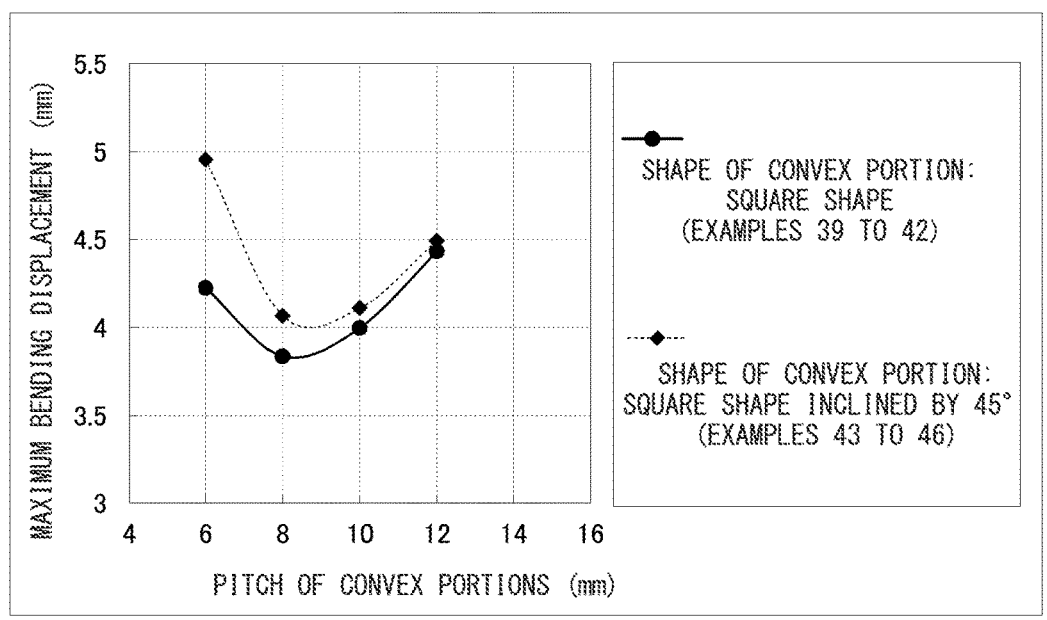
FIG. 31 is a graph illustrating an example of a rigidity evaluation results for the composite material molded bodies according to the examples of the present invention.

The results of Examples 39 to 42 are illustrated in FIG. 31.

When the shape of the convex portion 11 is square, it is possible to obtain an excellent rigidity effect when the pitch P of the convex portions is in the range of 7 to 10 mm with respect to the diagonal line of 5 mm of the square shape.

When the convex portion 11 is square, it is desirable that the pitch P of the convex portions be 1.4 to 2.0 times of the diagonal line of the square shape.

Example 43

Figure 24:
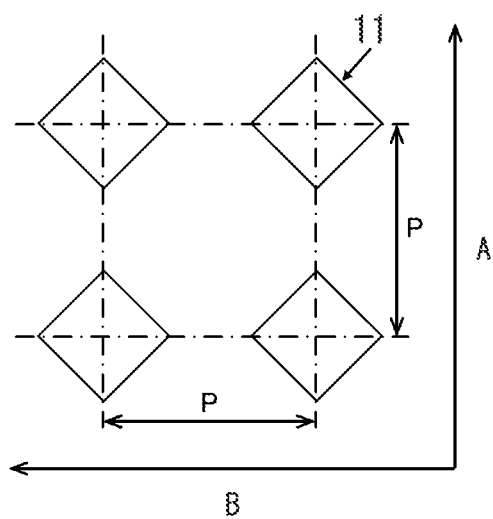
FIG. 24 is a top view illustrating an example of a shape and an arrangement of the convex portions of the thin sheet according to the embodiment of the present invention.

In Example 39, the shape of the convex portions 11 is changed to square rotated by 45° (FIG. 24), the arrangement is changed to the square arrangement, and the pitch P of the convex portions is changed to 6 mm.

By the same bending test as Example 2, the maximum bending displacement becomes 4.95 mm.

Example 44

In Example 43, the pitch P of the convex portions is changed to 8 mm.

By the same bending test as Example 2, the maximum bending displacement becomes 4.07 mm.

Example 45

In Example 43, the pitch P of the convex portions is changed to 10 mm.

By the same bending test as Example 2, the maximum bending displacement becomes 4.11 mm.

Example 46

In Example 43, the pitch P of the convex portions is changed to 12 mm.

By the same bending test as Example 2, the maximum bending displacement becomes 4.49 mm.

The results of Examples 43 to 46 are illustrated in FIG. 31.

When the shape of the convex portion 11 is square inclined by 45°, it is possible to obtain an excellent rigidity effect in the range of 8 to 10 mm of the pitch P of the convex portions with respect to the diagonal line of 5 mm of the square shape.

When the shape of the convex portion 11 is square inclined by 45°, it is desirable that the pitch P of the convex portion be 1.6 to 2.0 times of the diagonal line of the square shape.

In Examples 47 to 50 below, the shape of the convex portion 11 is changed to regular hexagon.

Example 47

Figure 25:
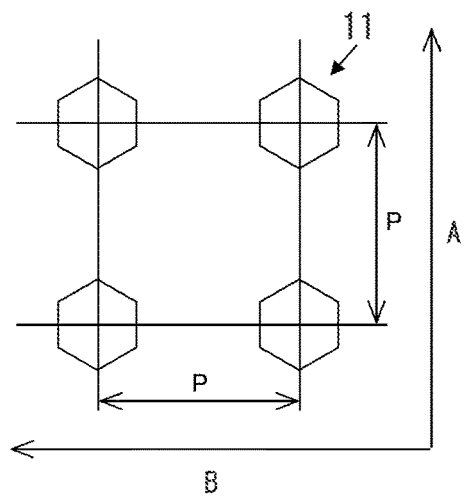
FIG. 25 is a top view illustrating an example of a shape and an arrangement of the convex portions of the thin sheet according to the embodiment of the present invention.

In Example 5, the shape of the convex portion 11 is changed to regular hexagon, and the arrangement is changed to the square arrangement (FIG. 25).

The size of the circumscribed circle of the regular hexagon is set to be 5 mm, and the pitch P of the convex portion is set to be 6 mm.

By the same bending test as Example 2, the maximum bending displacement becomes 4.90 mm.

Example 48

In Example 47, the pitch P of the convex portions is changed to 8 mm.

By the same bending test as Example 2, the maximum bending displacement becomes 4.03 mm.

Example 49

In Example 47, the pitch P of the convex portions is changed to 10 mm.

By the same bending test as Example 2, the maximum bending displacement becomes 4.06 mm.

Example 50

In Example 47, the pitch P of the convex portions is changed to 12 mm.

By the same bending test as Example 2, the maximum bending displacement becomes 4.41 mm.

Figure 32:
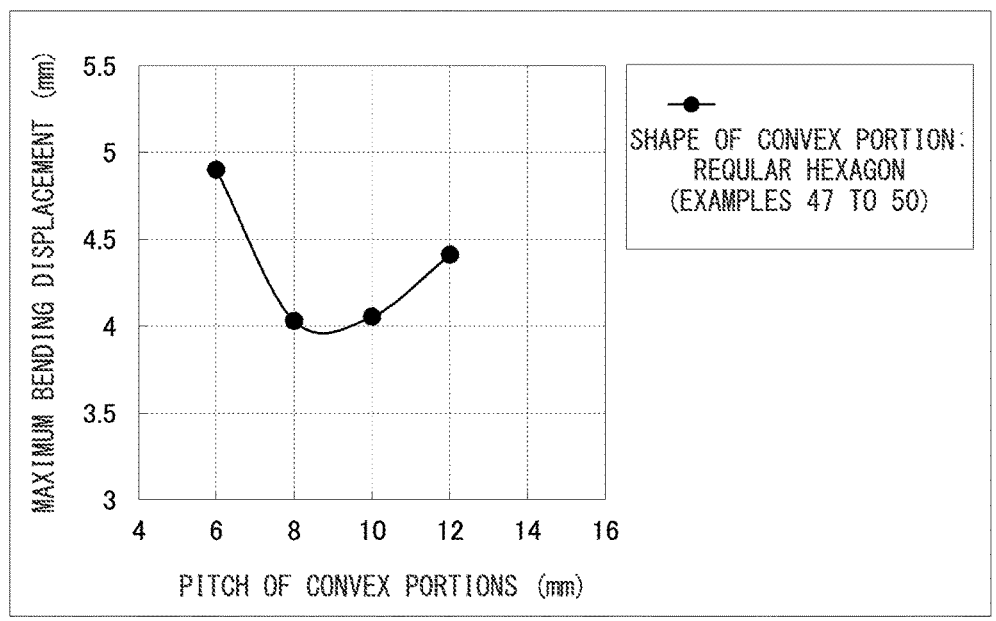
FIG. 32 is a graph illustrating an example of a rigidity evaluation results for the composite material molded bodies according to the examples of the present invention.

The results of Examples 47 to 50 are illustrated in FIG. 32.

When the shape of the convex portion 11 is regular hexagon, it is possible to obtain an effective rigidity improvement in the range of 8 to 12 mm of the pitch P of the convex portion with respect to the circumscribed circle of 5 mm.

When the shape of the convex portion 11 is regular hexagonal, it is desirable that the pitch P of the convex portion be 1.6 to 2.4 times of the size of the circumscribed circle of the regular hexagon.

Figure 27:
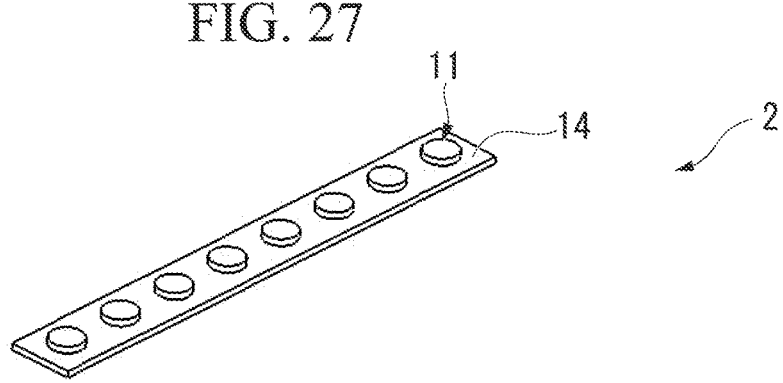
FIG. 27 is a perspective view illustrating an example of a shape of a thin sheet evaluated in the example of the present invention.

In Examples 51 to 64, in the fiber reinforced composite material structure 6 in which the thin sheet 2 and the surface material 1 are bonded to each other at the top face portion 12 of the convex portion 11 with the adhesive 3, evaluated is the three-point bending of the rectangle (FIG. 27) in which the convex portions 11 of the thin sheet 2 are arranged in a line at regular pitch P along the longitudinal direction. The entire length of the rectangle is set to be 100 mm, and the width is set to be equal to the pitch P of the convex portions. Further, as the three-point bending condition, the distance between the support points is set to 80 mm and the load is a linear load at the center of the support points and is set to be 2 N/mm with respect to the width. As the bending displacement of the structure, the maximum bending displacement of the lower surface of the structure (on the side of the thin sheet 2) at the center between the support points is measured.

The fiber reinforced composite material forming the surface material 1 and the thin sheet 2 is set to be same as in Example 5.

Examined is a case in which a structure having a thickness of 1.25 mm is obtained by setting the fiber reinforced composite material laminate forming the thin sheet 2 and the surface material 1 as a triple-layer laminate of [0°/90°/0°] same as Example 5, setting the thickness of each layer to be 0.1 mm, setting the height H of the convex portion 11 to be 0.55 mm, and setting the thickness of the adhesive 3 to be 0.1 mm.

Example 51

The convex portion 11 is changed to column shape having a diameter of 3 mm. The pitch P of the convex portions is set to be 4 mm, the width is set to be 4 mm, and the load becomes 8 N.

By the three-point bending test, the maximum bending displacement of the structure becomes 3.13 mm.

Example 52

In Example 51, the pitch P and the width of the convex portion are changed to 6 mm and the load is changed to 12 N.

By the three-point bending test, the maximum bending displacement of the structure becomes 2.55 mm.

Example 53

In Example 51, the pitch P and the width of the convex portion are changed to 8 mm and the load is changed to 16 N.

By the three-point bending test, the maximum bending displacement of the structure becomes 2.68 mm.

Example 54

In Example 51, the pitch P and the width of the convex portion are changed to 10 mm and the load is changed to 20 N.

By the three-point bending test, the maximum bending displacement of the structure becomes 3.08 mm.

Example 55

In Example 51, the diameter of the convex portion 11 is changed to 5 mm, the pitch P and the width of the convex portion are changed to 6 mm, and the load is changed to 12 N.

By the three-point bending test, the maximum bending displacement of the structure becomes 4.02 mm.

Example 56

In Example 55, the pitch P and the width of the convex portion are changed to 8 mm and the load is changed to 16 N.

By the three-point bending test, the maximum bending displacement of the structure becomes 2.91 mm.

Example 57

In Example 55, the pitch P and the width of the convex portion are changed to 10 mm and the load is changed to 20 N.

By the three-point bending test, the maximum bending displacement of the structure becomes 2.85 mm.

Example 58

In Example 55, the pitch P and the width of the convex portion are changed to 12 mm and the load is changed to 24 N.

By the three-point bending test, the maximum bending displacement of the structure becomes 3.12 mm.

Example 59

In Example 55, the pitch P and the width of the convex portion are changed to 14 mm and the load is changed to 28 N.

By the three-point bending test, the maximum bending displacement of the structure becomes 3.44 mm.

Example 60

In Example 60, the diameter of the convex portion 11 is changed to 7 mm, the pitch P and the width of the convex portion are changed to 8 mm, and the load is changed to 16 N.

By the three-point bending test, the maximum bending displacement of the structure becomes 4.58 mm.

Example 61

In Example 60, the pitch P and the width of the convex portion are changed to 10 mm and the load is changed to 20 N.

By the three-point bending test, the maximum bending displacement of the structure becomes 3.29 mm.

Example 62

In Example 60, the pitch P and the width of the convex portion are changed to 12 mm, and the load is changed to 24 N.

By the three-point bending test, the maximum bending displacement of the structure becomes 3.12 mm.

Example 63

In Example 60, the pitch P and the width of the convex portion are changed to 14 mm and the load is changed to 28 N.

By the three-point bending test, the maximum bending displacement of the structure becomes 3.18 mm.

Example 64

In Example 60, the pitch P and the width of the convex portion are changed to 16 mm and the load is changed to 32 N.

By the three-point bending test, the maximum bending displacement of the structure becomes 3.58 mm.

Figure 33:
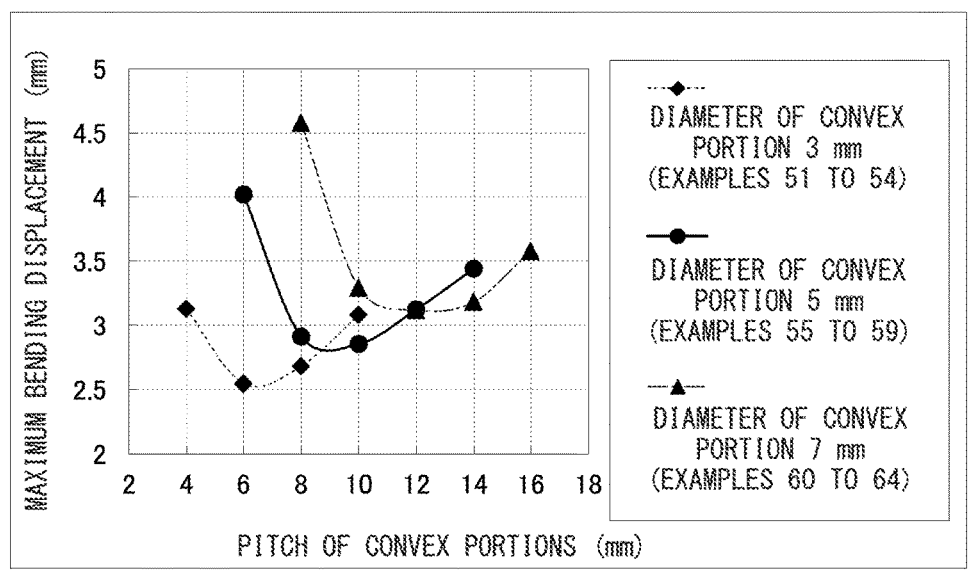
FIG. 33 is a graph illustrating an example of a rigidity evaluation results for the composite material molded bodies according to the examples of the present invention.

The results of Examples 51 to 64 are illustrated in FIG. 33. In any case that the size of the convex portion 11 is set to be any one of the diameters 3, 5, and 7 mm, the bending displacement of the structure becomes minimal when the pitch P of the convex portion is about 2 times of the diameter. Accordingly, it is possible to obtain a satisfactory rigidity effect around the range.

That is, the rigidity effect is determined by the ratio between the size of the convex portion and the pitch P of the convex portions.

Further, the minimum value of the maximum bending displacement decreases as the diameter of the convex portion 11 decreases, and hence the rigidity effect is improved.

In Example 65 to 68 below, the shape of the connection surface 13 connecting the top face portion 12 of the convex portion 11 to the base 14 is set to the shape of the inclined surface illustrated in FIG. 4A.

Example 65

In the thin sheet 2 of Example 5, the connection portion of the connection surface 13 connecting the base 14 to the top face portion 12 of the convex portion 11 arranged in a square shape with respect to the base 14 is set to be a circle having a diameter of 5 mm, the connection surface 13 is set to be the inclined surface having an inclination angle of 60°, and the diameter of the top face portion 12 of the convex portion 11 is changed to 4.36 mm.

By the same bending test as Example 2, the maximum bending displacement becomes 4.05 mm.

Example 66

In Example 65, the connection surface 13 connecting the convex portion 11 to the base 14 is changed to the inclined surface having an inclination angle of 45°, and the diameter of the top face portion 12 of the convex portion 11 is changed to 3.9 mm.

By the same bending test as Example 2, the maximum bending displacement becomes 4.11 mm.

Example 67

In the thin sheet 2 of Example 16, the connection portion of the connection surface 13 connecting the base 14 to the top face portion 12 of the convex portion 11 arranged in a zigzag shape of ±45° with respect to the base 14 is set to be a circle having a diameter of 5 mm, the connection surface 13 is set to be the inclined surface having an inclination angle of 60°, and the diameter of the top face portion 12 of the convex portion 11 becomes 4.36 mm.

By the same bending test as Example 2, the maximum bending displacement becomes 4.09 mm.

Example 68

In Example 67, the connection surface 13 connecting the convex portion 11 to the base 14 is set to be the inclined surface having an inclination angle of 45°, and the diameter of the top face portion 12 of the convex portion 11 becomes 3.9 mm.

By the same bending test as Example 2, the maximum bending displacement becomes 4.12 mm.

Figure 34:
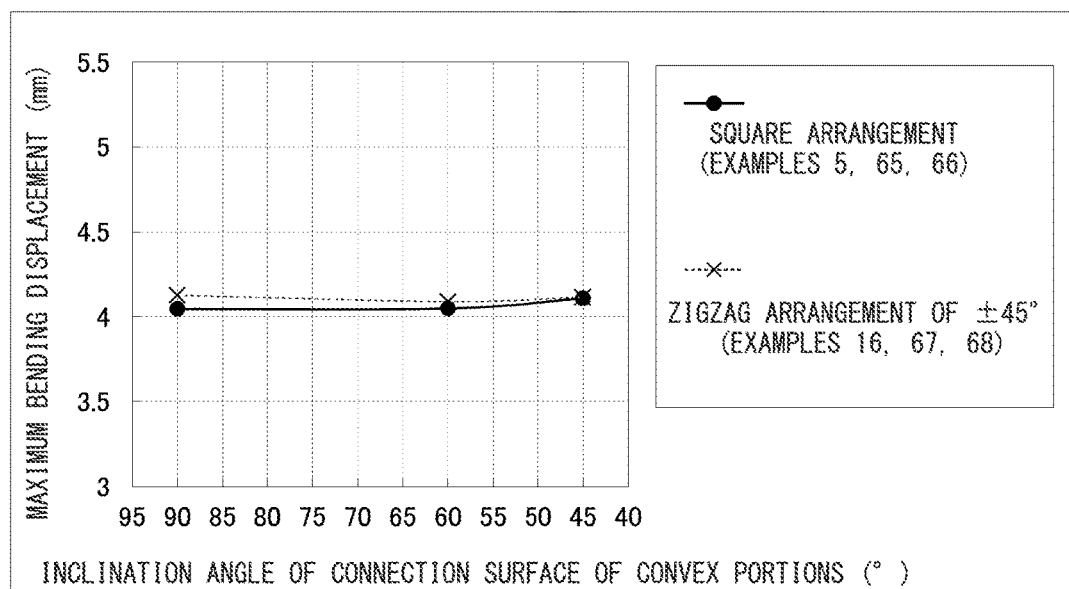
FIG. 34 is a graph illustrating an example of a rigidity evaluation results for the composite material molded bodies according to the examples of the present invention.

FIG. 34 illustrates the results of Examples 5 and 16 in which the connection surface 13 between the top face portion 12 of the convex portion 11 and the base 14 is cylindrical and Examples 65, 66, 67, and 68.

In any one of the square arrangement and the zigzag arrangement, the bending displacement is substantially the same even when the connection surface 13 connecting the top face portion 12 of the convex portion 11 to the base 14 is an inclined surface shape or a cylindrical shape, and the same rigidity may be obtained.

As the molding example of the thin sheet 2 with the convex portion 11, the method of heating and pressing the prepreg laminate of Example 1 is known. However, since the ratio of stretching the prepreg laminate by pressing decreases by forming the connection surface 13 between the top face portion 12 of the convex portion 11 and the base 14 in an inclined surface shape instead of a cylindrical shape, the moldability is improved.

Furthermore, it is desirable that the inclination angle of the inclined surface be 45° or more in order to ensure a sufficient bonding area.

In Examples 69 to 74 below, the pitch of the convex portions 11 arranged in the rectangular arrangement is examined.

Example 69

Figure 35:
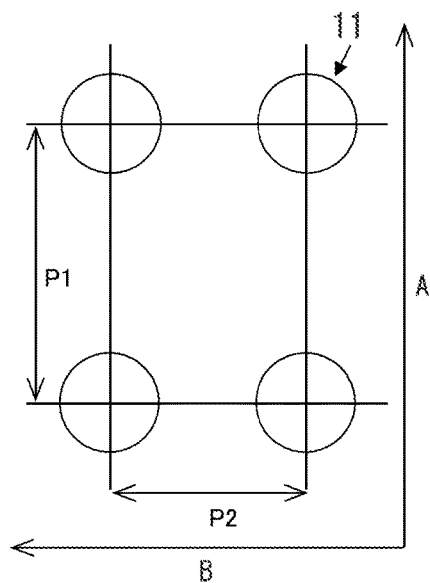
FIG. 35 is a top view illustrating an example of a shape and an arrangement of the convex portions of the thin sheet according to the embodiment of the present invention.

In the thin sheet 2 of Example 7, the arrangement of the convex portion 11 is set to be the rectangular arrangement illustrated in FIG. 35, the P1 (the pitch 1 of the convex portions in the rectangular arrangement) is set to be 6 mm, the P2 (the pitch 2 of the convex portions in the rectangular arrangement) is set to be 10 mm, the thickness of each of the fiber reinforced composite material layers forming the surface material 1 and the thin sheet 2 is set to be 0.1 mm, and the height H of the convex portion 11 is set to be 0.55 mm, thereby obtaining a structure having a thickness of 1.25 mm.

By the same bending test as Example 2, the maximum bending displacement becomes 4.16 mm.

Example 70

In Example 69, P1 is changed to 8 mm.

By the same bending test as Example 2, the maximum bending displacement becomes 4.05 mm.

Example 71

In Example 69, P1 is changed to 12 mm.
By the same bending test as Example 2, the maximum bending displacement becomes 4.12 mm.

Example 72

In Example 69, P1 is changed to 14 mm.
By the same bending test as Example 2, the maximum bending displacement becomes 4.21 mm.

Example 73

In Example 69, P1 is changed to 16 mm.
By the same bending test as Example 2, the maximum bending displacement becomes 4.33 mm.

Example 74

In Example 69, P1 is changed to 18 mm.
By the same bending test as Example 2, the maximum bending displacement becomes 4.41 mm.

Figure 36:
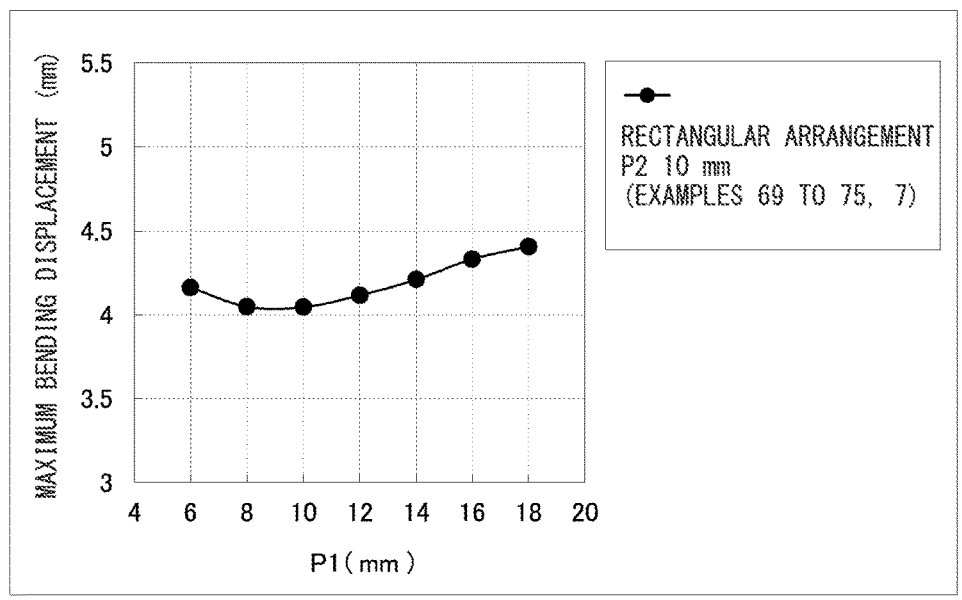
FIG. 36 is a graph illustrating an example of a rigidity evaluation results for the composite material molded bodies according to the examples of the present invention.

FIG. 36 illustrates the results of Example 7 of the square arrangement in which P1 and P2 are 10 mm and Examples 69 to 74.

The square arrangement of Example 7 has the highest rigidity, and the excellent rigidity is obtained even in the range of 8 to 12 mm of P1.

In the rectangular arrangement, the long sides and the short sides of the rectangular shape corresponding to the size of each convex portion 11 are desirably equal to or larger than 1.6 times and equal to or smaller than 2.4 times of the size of the convex portion 11, and the ratio between the short sides and the long sides is desirably equal to or larger than 1 time and equal to or smaller than 1.25 times.

While the embodiments of the present invention have been described, the technical scope of the present invention is not limited to the above-described embodiments, and combinations, modifications, or omissions of the components of the embodiments may be made in various ways without departing from the spirit of the present invention.

INDUSTRIAL APPLICABILITY

The present invention relates to a fiber reinforced composite material structure which is excellent in the light weight property, the thin thickness property, and the rigidity, a composite material molded body using the same, and a manufacturing method therefor, and may be widely used in sports, leisure, industries of automobiles or airplanes, and casings of electric/electronic devices such as personal computers, household electrical appliances, and medical instruments.

EXPLANATIONS OF LETTERS OR NUMERALS

1 Surface material
2 Thin sheet
3 Adhesive
4 Resin structure
5 Bonding portion
6 Fiber reinforced composite material structure
7 Composite material molded body
8 Lower die for thin sheet
9 Protrusion for convex portion
10 Protrusion for elongated protrusion
11 Convex portion
12 Top face
13 Connection surface
14 Base
15 Elongated protrusion
16 Upper surface of elongated protrusion
17 Side surface of elongated protrusion
18 Front end
19 Recess
20 Front end of elongated protrusion
21 Recess of elongated protrusion
P Pitch of convex portion
A Fiber lamination direction of 0°
B Fiber lamination direction of 90°
Y Support table
Z Intensive load
P1 Pitch 1 of convex portions of rectangular arrangement
P2 Pitch 2 of convex portions of rectangular arrangement
W1 Size of convex portion
W2 Size of elongated protrusion
G1 Center axis of first convex portion (position of geometric center of gravity of first convex portion)
G2 Center axis of second convex portion (position of geometric center of gravity of second convex portion)
H Height of convex portion
S Area of top face of convex portion
γ Angle formed between base and connection surface

The invention claimed is:

1. A fiber reinforced composite material structure comprising:
    a thin sheet that includes a first surface and a plurality of convex portions which protrude and are regularly arranged on the first surface and each of which includes a top face, the thin sheet including a reinforcing fiber; and
    a surface material that includes a second surface and is bonded to top faces of the convex portions on the second surface,
    wherein the reinforcing fiber in the thin sheet is a sheet-like material in which a plurality of long fibers are arranged in parallel in one direction where the sheet-like material is laminated so that each of the long fibers is aligned in 0° and 90° directions or a fabric formed of a long fiber,
    an arrangement of the plurality of convex portions includes a zigzag arrangement in which an arrangement direction of the plurality of convex portions forms an angle with respect to a longitudinal fiber direction of the reinforcing fiber,
    the plurality of convex portions include a first convex portion and a second convex portion adjacent to the first convex portion,
    a first area is defined by being surrounded by a boundary line between one convex portion among the plurality of convex portions, and the first surface,
    a pitch of the convex portions is 1.6 to 2.4 times the minimum diameter of the first area, and
    the pitch of the convex portions is defined by the gap between a center axis of the first convex portion which is perpendicular to the first surface and a center axis of the second convex portion which is perpendicular to the first surface.

2. The fiber reinforced composite material structure according to claim 1,
    wherein in the convex portion among the plurality of convex portions, the shape of the top face of the convex portion and the shape of the first area are at least one shape selected from a square shape, a rectangular shape, a rhombic shape, a triangular shape, a pentagonal shape, a hexagonal shape, a circular shape, an oval shape, a rounded square shape, a rounded rectangular shape, a rounded rhombic shape, a rounded triangular shape, a rounded pentagonal shape, and a rounded hexagonal shape.

3. The fiber reinforced composite material structure according to claim 1,
wherein in a second area provided with the plurality of convex portions arranged regularly, the ratio $\beta/\alpha$ is equal to or larger than 5% and smaller than 40%,
where $\alpha$ and $\beta$ is the area of the second area and the total area of the top faces of the plurality of convex portions, respectively.

4. The fiber reinforced composite material structure according to claim 1,
wherein in one convex portion among the plurality of convex portions, the area of the top face of the convex portion is equal to or larger than 5 times and smaller than 500 times of the square of the sheet thickness of the thin sheet.

5. The fiber reinforced composite material structure according to claim 1,
wherein the height of each of the plurality of convex portions is equal to or larger than 0.5 times and smaller than 10 times of the sheet thickness of the thin sheet.

6. The fiber reinforced composite material structure according to claim 1,
wherein in each of the plurality of convex portions, the minimum Feret diameter in a cross-section parallel to the top face is equal to or larger than 3 times of and smaller than 30 times of the sheet thickness of the thin sheet.

7. The fiber reinforced composite material structure according to claim 1,
wherein a concave recess is provided in each front end of the plurality of convex portions.

8. The fiber reinforced composite material structure according to claim 1,
wherein the arrangement of the plurality of convex portions further includes at least one of a square arrangement in which the plurality of convex portions are arranged at the directions of 0° and 90° with respect to the longitudinal fiber direction of the reinforcing fiber and a rectangular arrangement in which the plurality of convex portions are arranged at the directions of 0° and 90° with respect to the longitudinal fiber direction of the reinforcing fiber.

* * * * *